United States Patent [19]

Nicol et al.

[11] Patent Number: 5,548,273

[45] Date of Patent: Aug. 20, 1996

[54] VEHICLE DRIVING MONITOR APPARATUS

[75] Inventors: Geoffrey P. Nicol, Terth, Australia; Brian E. Kratz; Allen J. Studer, both of Lawrence, Ind.

[73] Assignee: Competition Components International Pty Ltd, Australia

[21] Appl. No.: 541,186

[22] Filed: Oct. 11, 1995

Related U.S. Application Data

[63] Continuation of Ser. No. 84,512, Jun. 29, 1993, abandoned.

[51] Int. Cl.[6] .................................... B60Q 1/00
[52] U.S. Cl. .................. 340/439; 340/438; 340/440; 364/424.03; 364/424.04; 73/432.1
[58] Field of Search .................................. 340/439, 438, 340/440; 364/424.03, 424.04; 73/432.1

[56] References Cited

U.S. PATENT DOCUMENTS

| | | | |
|---|---|---|---|
| 4,093,939 | 6/1978 | Mitchell | 340/439 |
| 4,500,868 | 2/1985 | Tokitsu et al. | 340/439 |
| 4,627,011 | 12/1986 | Spencer et al. | 364/566 |
| 4,638,289 | 1/1987 | Zottnik | 246/45 |
| 4,644,368 | 2/1987 | Mutz | 346/330 |
| 4,671,111 | 6/1987 | Lemelson | 73/432.1 |
| 4,677,429 | 6/1987 | Gloztbach | 345/168 |
| 4,694,687 | 9/1987 | Bonin et al. | 73/116 |
| 4,748,848 | 6/1988 | Scholl et al. | 73/517 B |
| 4,845,464 | 7/1989 | Drori et al. | 340/429 |
| 4,858,133 | 8/1989 | Takeuchi et al. | 364/424.04 |
| 4,866,616 | 9/1989 | Takeuchi et al. | 364/424.04 |
| 4,908,767 | 3/1990 | Scholl et al. | 364/453 |
| 4,922,943 | 5/1990 | McCracken | 137/1 |
| 4,939,652 | 7/1990 | Steiner | 364/424.04 |
| 4,944,775 | 7/1990 | Nusair et al. | 95/51 |
| 4,973,925 | 11/1990 | Nusair et al. | 333/26 |
| 5,020,754 | 6/1991 | Davis et al. | 244/165 |

Primary Examiner—John K. Peng
Assistant Examiner—Daryl C. Pope
Attorney, Agent, or Firm—Barnes & Thornburg

[57] ABSTRACT

An apparatus for monitoring operation a vehicle apparatus includes sensors for sensing G-forces on the vehicle and for generating output signals proportional to a forward G-force, a reverse G-force, a left direction G-force, and a right direction G-force on the vehicle. The apparatus permits an authorized user to set a selected maximum G-force limit for each direction. The apparatus stores G-force output signals generated by the sensors which are higher than the maximum selected limit for each direction. An oven heats each sensor to a substantially constant predetermined temperature, thereby improving the accuracy of the output signals from the sensor upon fluctuation of an ambient temperature adjacent the apparatus. The apparatus detects when the apparatus has been disconnected from a power supply to alert an owner of the vehicle that the vehicle may have been driven without the monitoring apparatus in operation.

33 Claims, 25 Drawing Sheets

MENU BRANCH TREE AND SUBROUTINE LISTING

VEHICLE DRIVING MONITOR APPARATUS

This is a continuation of application Ser. No. 08/084,512 filed Jun. 29, 1993, now abandoned.

BACKGROUND AND SUMMARY OF THE INVENTION

The present invention relates to a vehicle driving monitor. The apparatus of the present invention is designed to monitor the limits at which a vehicle has been driven over a given period of time. The present invention is particularly useful to monitor rental cars or a fleet of vehicles. The monitor of the present invention records excessive G-forces on a vehicle caused by overly-aggressive or reckless driving. Therefore, a particular vehicle or a particular driver can be monitored by the vehicle owner to determine whether the vehicle is being driven within preselected limits set by the owner, whether the vehicle is being abused, and whether the vehicle is being driven in a manner to promote better fuel economy.

The owner of the vehicle can set selected maximum G-force limits by programming the monitor. When installed in a vehicle, the driving monitor measures and records the highest G-force readings on the vehicle caused by cornering, acceleration, and braking. These recordings can only be cleared using a security code or password. In addition, if power is removed before the recorded values have been cleared by the owner, a clocking circuit records the power disconnect, and indicates that power has been disconnected on a display screen of the monitor. The clocking circuit also records the total time that power was disconnected from the monitor. Warning lights and a tone generator may be provided to provide an indication to the driver that the driver is approaching the selected maximum limits to permit the driver to slow down in order to avoid exceeding the G-force preset limits.

Therefore, the vehicle driving monitor of the present invention advantageously provides an apparatus which allows the owner of the vehicle to decide how the vehicle is to be driven. A visual display permits the driver to monitor performance. In a preferred embodiment of the present invention, the monitor records the highest five G-force readings which exceed the selected G-force limit in an internal memory for the owner's review until the owner clears the memory using the password. The monitor of the present invention permits the owner of the vehicle to promote safe driving habits, to promote fuel economy, to identify unsafe or over aggressive drivers, and to reduce the service and maintenance cost on the vehicles. Promoting safe driving of vehicle also improves the vehicle's resale value. In some instances, it may be possible to obtain reduced insurance rates by monitoring how vehicles are driven.

The vehicle driving monitor of the present invention is equipped with a tri-level password system designed to control access to user defined G-force limits, allowable driver options, and acceleration or G-force records. Each password may illustratively be up to 10 digits long. Throughout the specification and claims, the terms driver, user, distributor, and manufacturer will be used. The driver is the person or persons operating the monitored vehicle. The driver's options include only how data is displayed on a display screen of the monitor. The driver cannot alter the data recorded by the monitor. The options available to the driver can be limited by higher access personnel.

The user is the person or persons authorized to set the maximum G-force values and to review recorded acceleration data. For instance, the user may be the owner of the vehicle or fleet of vehicles being monitored. Therefore, the terms "user" and "owner" are used interchangeably throughout the specification. The user password allows access to all of the features of the vehicle driving monitor. The user password may be changed by the user, the distributor, or the manufacturer.

The distributor is the person or persons who hold a master password. Typically, this will be a local distributor or rental agency manager. The distributor password also allows access to all of the features of the vehicle driving monitor. A primary purpose of the distributor password is to provide a backup password in case the user password is forgotten. The distributor password permits the user password to be changed without shipping of the monitor back to the manufacturer. The distributor password can only be changed by the distributor and the manufacturer.

The manufacturer password allows access to all user and distributor options of the vehicle driving monitor. In addition, the manufacturer password provides access to test and calibration routines. The manufacturer password or serial number for the monitor can be changed only by the manufacturer.

The monitor of the present invention provides a real time G-force measuring and recording instrument for monitoring G-forces on the vehicle which influence vehicle wear.

The vehicle driving monitor of the present invention determines whether a power supply has been removed from the monitor. Removal of the power supply means that the vehicle may have been operated in violation of the selected G-force limits while the monitor was turned off. An internal real time clock allows the user to determine whether the power has been removed from the monitor. If power has been removed, the real time clock is used to record the total amount of time that power was removed.

The driving monitor of the present invention stores all the G-force data in a non-volatile memory upon detection that power has been removed. Therefore, the information stored by the monitor is not lost if power is disconnected from the monitor.

The vehicle driving monitor of the present invention advantageously provides four independent directional acceleration signals. Therefore, the user can monitor G-forces in a forward direction, a reverse direction, a right direction, and a left direction on the vehicle. Separate records are stored for each of the four directions and the user can select maximum G-force limits for each of the four directions. G-forces which exceed these selected limits cause a violation counter to be incremented. In addition, the five highest G-force measurements which exceed the preselected limit for each of the four directions will be recorded and sorted.

The user may allow a visual warning such as a direction indicating LED or an audible warning before the driver exceeds the selected G-force limits for a particular direction. Either the audible warning or the visual warning, or both, may be disabled by the user. Therefore, the driver will not be warned prior to exceeding a preset G-force limit.

The driver may select to display only one of the four directions on a display of the monitor. In addition, the driver can select to continuously display the two active directions automatically. In the unidirectional mode, the number of times the limit has been exceeded in the display direction will also be displayed. Any of these driver options may be disallowed by the user.

The vehicle driving monitor of the present invention may be connected to a computer terminal to permit the information recorded by the monitor to be loaded into the computer. This permits bulk storage and listings of all real-time accelerations and may be used to analyze and record the driving history of a particular vehicle or a particular driver.

According to one aspect of the present invention, an apparatus powered by a power supply is provided for monitoring operation of a vehicle. The apparatus includes means for sensing G-forces on the vehicle. The sensing means generates an output signal proportional to the G-forces on the vehicle. The apparatus also includes means for storing G-force output signals generated by the sensing means which are higher than a selected limit, and means for detecting that the power supply for powering the apparatus has been disconnected. The detecting means provides an indication that the vehicle may have been driven without the sensing means and storing means in operation.

In the illustrated embodiment, the detecting means includes a counter for indicating the number of times the apparatus has been disconnected from the power supply. The detecting means also includes a clock which is activated upon disconnection of the power supply from the apparatus, and means coupled to the clock for storing the total length of time that the apparatus is disconnected from the power supply. The storing stores a predetermined number of the highest G-force output signals from the sensing means in a non-volatile memory upon detection of disconnection of the power supply from the apparatus by the detecting means.

Also in the illustrated embodiment, the apparatus further includes means generating a warning signal when a G-force output signal from the sensing means exceeds said selected G-force limit. The warning signal may be generated when the G-force output signal from the sensing means exceeds a threshold level which is a predetermined amount less than the selected G-force limit to permit a driver to correct a driving condition before the selected G-force limit is exceeded.

According to another aspect of the invention, an apparatus is provided for monitoring operation a vehicle. The apparatus includes a sensor for detecting G-forces on the vehicle. The sensor generates an output signal proportional to the G-forces on the vehicle. The apparatus also includes means for monitoring the output signals from the sensor, and an oven surrounding the sensor for heating the sensor to a substantially constant predetermined temperature, thereby improving the accuracy of the output signal from the sensor upon fluctuation of an ambient temperature adjacent the apparatus.

According to yet another aspect of the present invention, an apparatus is provided for monitoring operation a vehicle. The apparatus includes means for sensing G-forces on the vehicle. The sensing means generates output signals proportional to a forward G-force, a reverse G-force, a left direction G-force, and a right direction G-force on the vehicle. The apparatus also includes means for permitting an authorized user to set a selected maximum G-force limit for the forward direction, the reverse direction, the left direction, and the right direction. The apparatus further includes means for storing G-force output signals generated by sensing means which are higher than the maximum selected limit for the forward direction, the reverse direction, the left direction, and the right direction.

In the illustrated embodiment, the means for permitting an authorized user to set selected a maximum G-force limits includes means for analyzing a password of the user to determine whether the user is authorized to set the maximum G-force limits. The apparatus also includes means for displaying selected G-force output signals stored by the storing means, and means for permitting an authorized user to disable the displaying means.

Also in the illustrated embodiment, the G-force sensing means includes first and second acceleration sensors. The first acceleration sensor generates an output signal indicating both forward direction and reverse direction G-forces on the vehicle. The second acceleration sensor generates an output signal indicating left direction and right direction G-forces on the vehicle.

Additional objects, features, and advantages of the invention will become apparent to those skilled in the art upon consideration of the following detailed description of a preferred embodiment exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
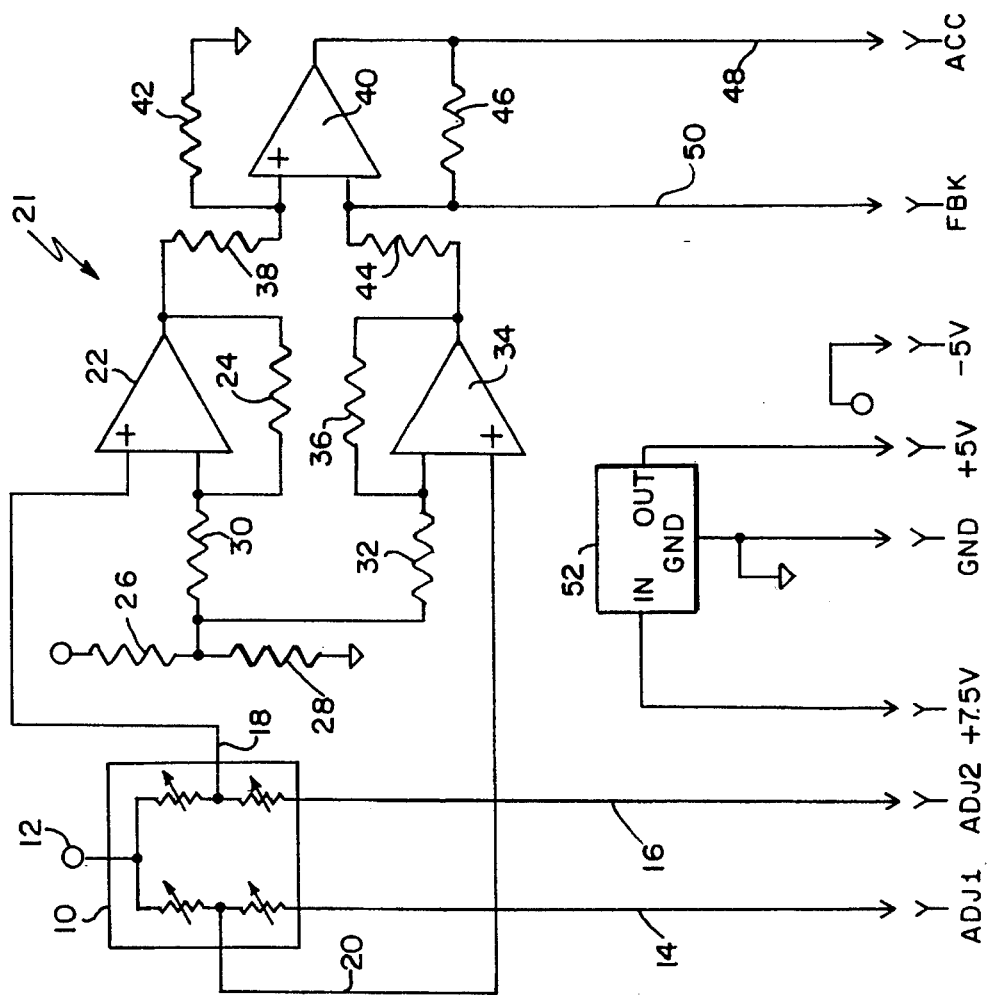
FIG. 1 is a schematic diagram of an acceleration monitor circuit of the present invention.

FIG. 1 illustrates an acceleration sensor circuit used to measure G-forces caused by acceleration, deceleration, or by right turns and left turns of a vehicle. The acceleration monitor of the present invention includes two acceleration sensor circuits such as the circuit illustrated in FIG. 1. A first sensor senses forward direction and reverse direction G-forces on the vehicle. A second sensor senses left direction and right direction forces on the vehicle. Illustratively, the acceleration sensors are 3031SM accelerometers available from IC Sensors. Since the two sensor circuits are identical, only one will be discussed.

Sensor 10 illustrated in FIG. 1 is coupled to a +5 V supply voltage 12. In addition, two input lines 14 and 16 are provided for calibrating a zero point of sensor 10. Signals ADJ1 and ADJ2 are supplied to lines 14 and 16. Sensor 10 provides first and second output voltages on lines 18 and 20 respectively. Both outputs on lines 18 and 20 are positive voltages. The difference between the voltages on lines 18 and 20 provides an indication of the G-force acting on sensor 10. The outputs from sensor 10 on lines 18 and 20 are coupled to a differential amplifier network 21. Specifically, output 18 of sensor 10 is coupled to a positive (+) input of amplifier 22. An output of operational amplifier 22 is coupled through a 10K resistor 24 to the (−) input of amplifier 22. The +5 V supply voltage is coupled through a series combination of a 1K resistor 26 and a 1K resistor 28 to ground. The common terminal of resistor 26 and resistor 28 is coupled through a 1K resistor 30 to the (−) input of amplifier 22. The common terminal of resistors 26 and 28 is also coupled through a 1K resistor 32 to the (−) input terminal of an operational amplifier 34. The second output voltage on line 20 from sensor 10 is coupled to the (+) input terminal of amplifier 34. An output from amplifier 34 is coupled through a 10K resistor 36 to the (−) input terminal of amplifier 34. The output of amplifier 22 is coupled through 1K resistor 38 to the (+) input terminal of an operational amplifier 40. The (+) input terminal of amplifier 40 is also coupled through a 10K resistor 42 to ground. The output terminal of amplifier 34 is coupled through a 1K resistor 44 to the (−) input terminal of amplifier 40. An output of amplifier 40 is coupled through a 10K resistor 46 to the (−) input terminal of amplifier 40.

The output of amplifier 40 provides a signal proportional to the G-force acting on sensor 10 and therefore on the vehicle. This output signal is labeled ACC. The ACC signal on line 48 is either a positive or negative voltage depending upon the direction of the G-force acting on sensor 10. For instance, depending upon the orientation of sensor 10, a positive voltage at line 48 may indicate a forward direction G-force caused by acceleration by the vehicle while a negative voltage may indicate a reverse direction G-force caused by deceleration. Line 50 coupled to the (−) input of amplifier 40 provides a feedback signal (FBK). The ACC and FBK signals are discussed below with reference to FIG. 5.

A voltage regulator 52 is also provided for generating the stable +5 V supply voltage. Voltage regulator 52 is illustratively a LM78L05 REG TO-92 regulator available from Motorola. As illustrated in FIG. 1, a +7.5V supply and a −5.0V supply are required.

It has been determined that the accuracy of acceleration sensors 10 change if the ambient temperature adjacent sensor 10 is allowed to fluctuate. Temperatures in a vehicle can change dramatically over the course of time. In a closed vehicle on a hot day, temperatures can soar to around 150°. Temperatures can also go to well below freezing. Therefore, in order to produce accurate readings from sensors 10 which do not drift when the ambient temperature changes, both sensors 10 are stored in oven interfaces to maintain the temperature of sensors 10 above a maximum level which may exist inside the vehicle.

Figure 2:
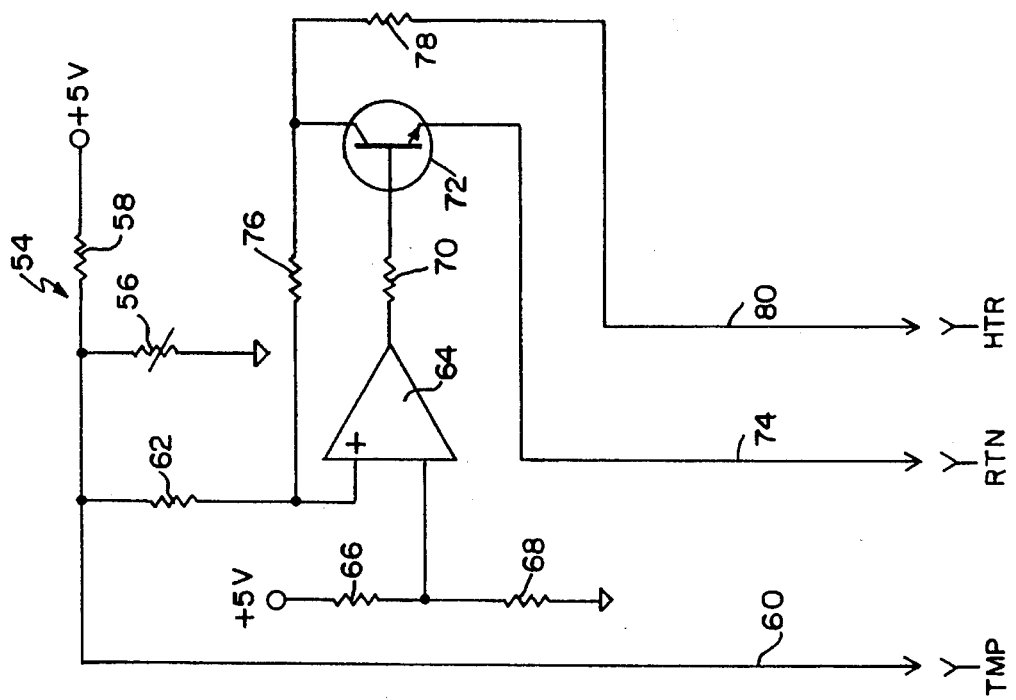
FIG. 2 is a schematic diagram of an oven stabilizer control circuit used to regulate the temperature of an oven.
Figure 5:
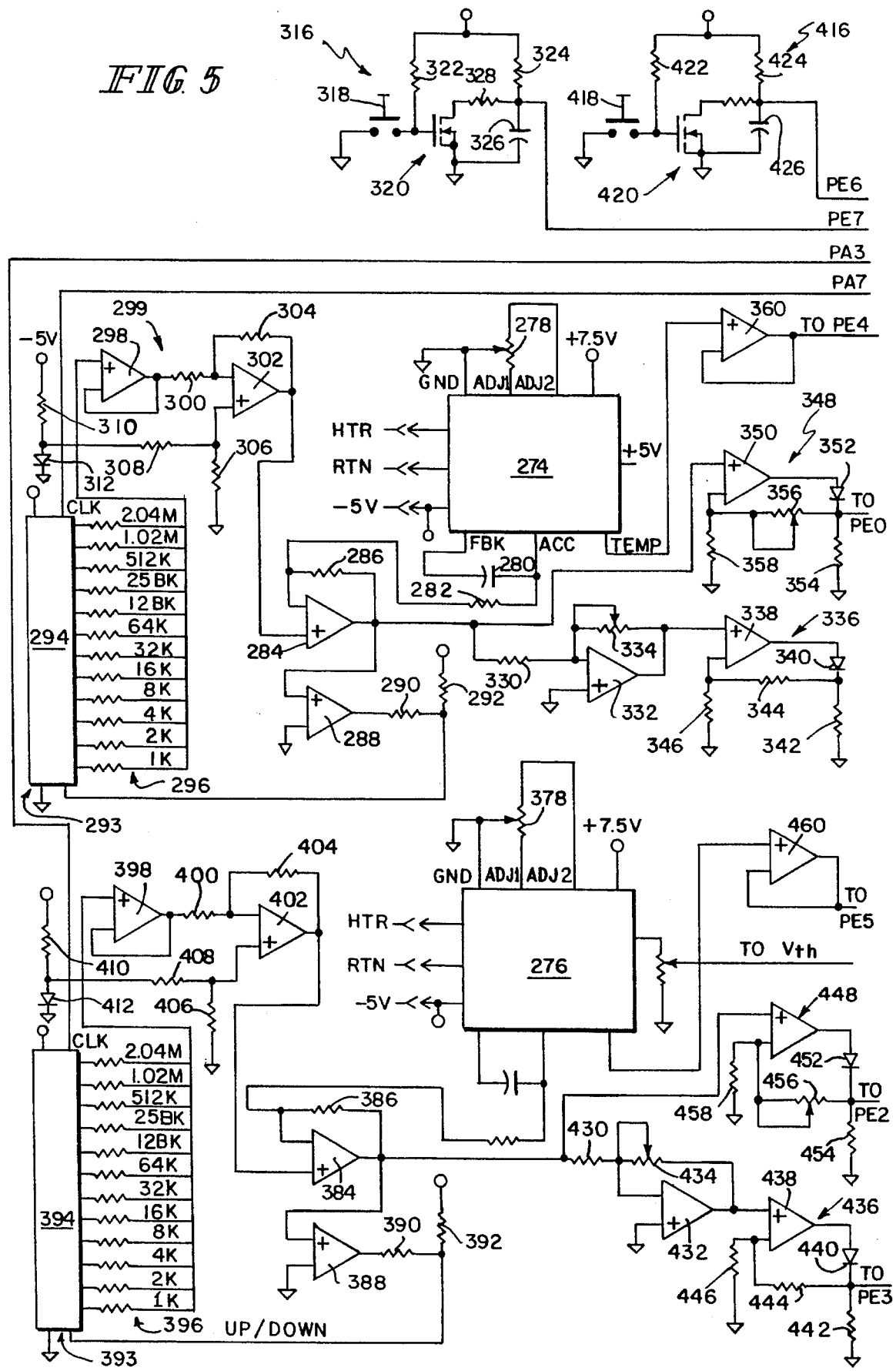
FIG. 5 is a schematic diagram illustrating a portion of the processor interface circuitry of the present invention including first and second ovens and first and second voltage compensation networks for the first and second acceleration sensors, respectively.

A closed feedback loop circuit 54 for ovens 274 and 276 of FIG. 5 is illustrated in FIG. 2. Again, separate circuits 54 are provided for each oven 274 and 276. Only one of the feedback circuits 54 will be discussed. Closed feedback loop circuit 10 includes a thermistor 56. Illustratively, thermistor 56 has a negative temperature coefficient 38.3K at 160° F. Glass Bead thermistor available from Shibaura Electric. The resistance of thermistor 56 decreases as the temperature increases. A first terminal of thermistor 56 is coupled through a 38.3K resistor 58 to the +5 V supply voltage. A second terminal of thermistor 56 is coupled to ground. The first terminal of thermistor 56 provides an output signal (TMP) on line 60 proportional to the temperature sensed by thermistor 56. The TMP signal permits microcontroller 314 to read the temperature. In addition, the first terminal of thermistor 56 is coupled through a 1K resistor 62 to a (+) input terminal of operational amplifier 64. Amplifiers 22, 34, 40 and 64 are each illustratively ¼ of a LM324 quad op-amp SM available from Motorola. The +5 V supply voltage is coupled through a 38.3K resistor 66 to the (−) input of amplifier 64. The (−) input terminal of amplifier 64 is also coupled through a 38.3K resistor 68 to ground. An output of amplifier 64 is coupled through a 1K resistor 70 to the base of transistor 72. Illustratively, transistor 72 is a 2N3904 NPN transistor available from Motorola. An emitter of transistor 72 provides an output signal (RTN) on line 74. The collector of transistor 72 is coupled through a 10M resistor 76 to the (+) input terminal of amplifier 64. The collector of transistor 72 is also coupled through a 47 ohm, ¼ W, metal film resistor 78 to provide an output signal (HTR) on line 80. Resistor 78 provides the heater for heating sensor 10. Therefore, resistor 78 is placed immediately adjacent sensor 10.

Separate feedback circuits 54 sense the temperature of ovens 274 and 276 in FIG. 5. When the sensed temperature rises above 160° F., circuit 54 turns the associated heater (resistor 78) off or down. When the temperature falls below 160° F., circuit 54 turns the associated heater (resistor 78) on or up.

Figure 3:
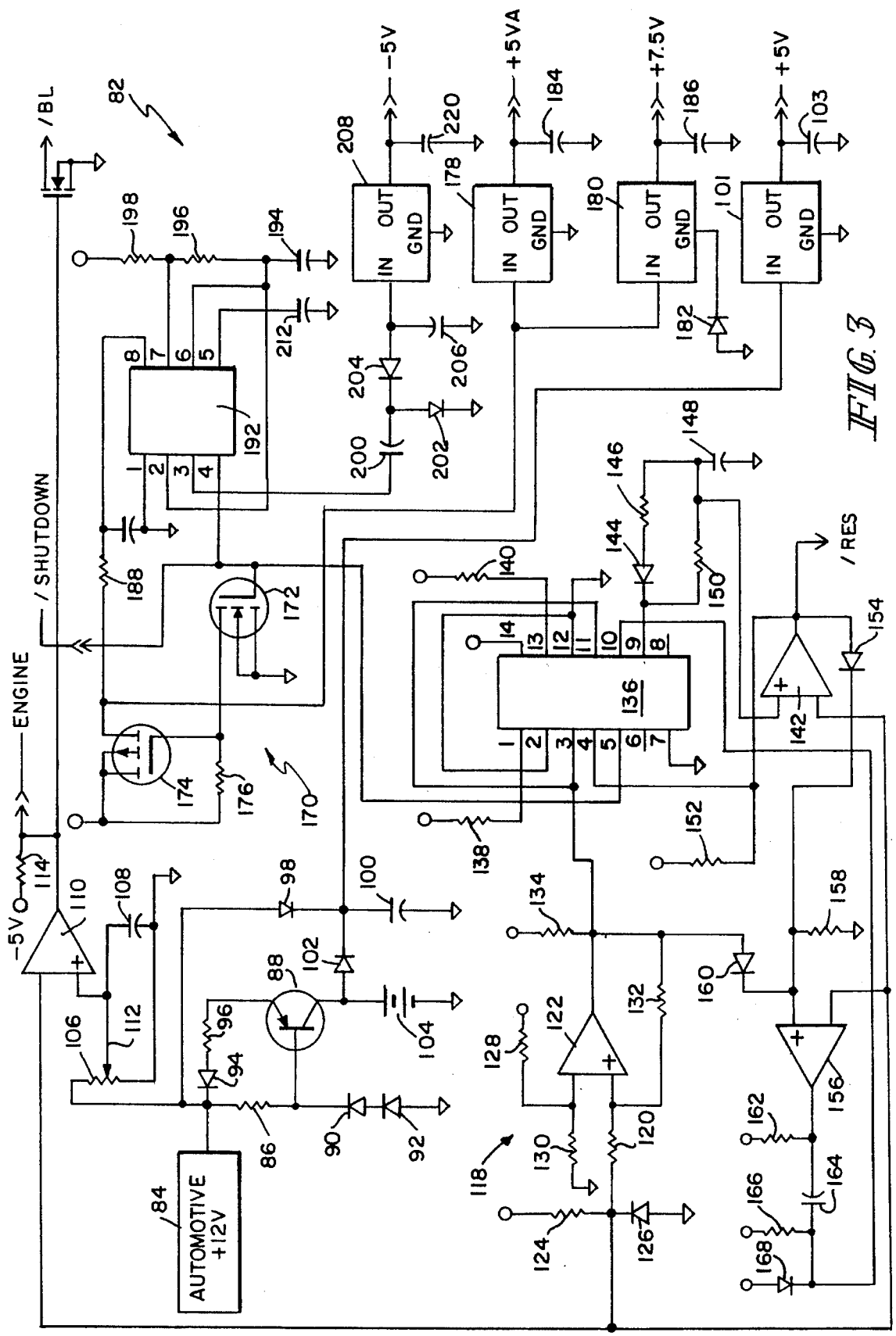
FIG. 3 is a schematic diagram illustrating a power supply and monitor circuit of the present invention.

A power supply and monitor circuit 82 is illustrated in FIG. 3. A +12 V supply voltage from the automobile is illustrated at block 84. The +12 V power supply may be obtained from a cigarette lighter of the vehicle or may be directly wired into the electrical system of the vehicle. Power supply 84 is coupled through a 1K resistor 86 to the base of transistor 88. Illustratively, transistor 88 is a 2N3906 transistor available from Motorola. The base of transistor 88 is coupled to the cathode of a +2.5 V zener diode 90. The anode of diode 90 is coupled to the cathode of a +7.5 V zener diode 92. The anode of diode 92 is coupled to ground. The common terminal of the power supply 84 and resistor 86 is coupled to an anode of diode 94. The cathode of diode 94 is coupled through a 50 ohm resistor 96 to the emitter of transistor 88. The common terminal of power supply 84, resistor 86, and diode 94 is coupled to the anode of diode 98. The cathode of diode 98 is coupled through a 4700 µF capacitor 100 to ground. The common terminal of diode 98 and capacitor 100 is coupled to the cathode of diode 102. The size of capacitor 100 is important. Capacitor 100 filters the power supply. The primary purpose for the size of capacitor 100 is so that power is retained long enough to permit the microcontroller 314 to store its data in the non-volatile memory (EEPROM). The power supply must be retained long enough for microcontroller 314 to store all of its information.

The anode of diode 102 is coupled to a 9.6 V NICAD battery 104. The battery 104 is coupled to the collector of transistor 88. Battery 104 is a backup battery so that the vehicle driving monitor remains operational if power supply 84 is supplied by a switched cigarette lighter which shifts off when the key is removed from the vehicle. Transistor 88 is coupled in a current limiting configuration. When power supply 84 is in operation, battery 104 is recharged. Steering diodes supply either the power from power supply 84 or battery 104 to the fuel unit, depending on which supply has the largest voltage.

The common terminal of diode 98, capacitor 100 and diode 102 is coupled to an input of regulator 101. Regulator 101 is illustratively a LM7805 regulator available from Motorola. The output of regulator 101 is coupled through a 0.1 µF capacitor 103 to ground. The output of regulator 101 provides a +5 V supply voltage.

Power supply circuit 82 also detects whether or not the engine of the vehicle is running by detecting a fluctuation in voltage supplied by power supply 84. If the vehicle is running, the alternator of the vehicle typically outputs a voltage in the range of about 13.8 to 14.6 V. A vehicle battery typically outputs a voltage in the range of about 12.0 to 12.5 V. Therefore, the power supply circuit 82 senses the level of the power supply voltage to determine whether or not the engine of the vehicle is running. This voltage level detection is provided by a 100K potentiometer 106, a 1 µF capacitor 108, and an operational amplifier 110. The automotive power supply 84 is coupled through potentiometer 106 to ground. Center tap 112 of potentiometer 106 is coupled to the (+) input of amplifier 110. The (+) input of amplifier 110 is also coupled through capacitor 108 to ground. The output of amplifier 110 is coupled through a 10K resistor 114 to a −5 V supply voltage. The output of amplifier of 110 provides an output signal labeled "ENGINE" which provides an indication whether the engine is running. The output of amplifier 110 is also coupled to the gate of FET 116. The source of FET device 116 is coupled to ground. The drain of FET device 116 provides an open drain output power supply signal (/BL) to the light source for backlighting an LCD display 214 discussed below with reference to FIG. 4. Therefore, when the engine is not running, the backlighting light source for display 214 is shut off.

A comparator circuit arrangement 118 is provided to sense when the input voltage drops below about +8 V. This voltage is set below the +12 V battery supply voltage 84 and below the voltage of the optional battery backup 104 which is about +9 volts. The (−) input terminal of amplifier 110 is coupled through a 20K resistor 120 to the (+) input terminal of operational amplifier 122. The (−) input terminal of amplifier is also coupled through a 10K resistor 124 to a +5 V supply voltage. In addition, the (−) input terminal of amplifier 110 is coupled to the cathode of a 2.5 V zener diode 126. The anode of zener diode 126 is coupled to ground. The (−) input terminal of amplifier 110 is also coupled to the (−) input terminals of operational amplifiers 142 and 156, respectively. The (−) input terminal of amplifier 122 is coupled through a 30K resistor 128 to a +5 V supply voltage. The (−) input terminal of amplifier 122 is also coupled through a 10K resistor 130 to ground. The output of amplifier 122 is coupled through a 100K resistor 132 to the (+) input terminal of amplifier 122. The output of amplifier 122 is also coupled through a 4.7K resistor 134 to the +5 V supply voltage. In addition, the output of amplifier 122 is coupled to pin 3 of a flip-flop circuit chip 136. Illustratively, flip-flop chip 136 is a 74 HC 74 flip-flop SM available from Motorola. Pin 1 of chip 136 is coupled through a 10K resistor 138 to the +5 V supply voltage. Pins 2, 7, and 12 are coupled to ground. Pin 11 is coupled to the output of amplifier 122. Pin 13 is coupled through a 10K resistor 140 to the +5 V supply voltage. Pin 14 is coupled directly to the +5 V supply voltage.

Pin 4 of chip 136 is coupled to the output of an operational amplifier 142. Pin 9 of chip 136 is coupled to the anode of diode 144. The cathode of diode 144 is coupled through the series combination of a 10K resistor 146 and a 33 µF capacitor 148. Pin 9 of chip 136 is also coupled through a 100K resistor 150 to the (+) input terminal of amplifier 142. The common terminal of resistor 146 and capacitor 148 is also coupled to the (+) input terminal of amplifier 142. The output of amplifier 142 is coupled through a 100K resistor 152 to the +5 V supply voltage. The output of amplifier 142 is coupled to the anode of diode 154. The cathode of diode 154 is coupled to a (+) input terminal of operational amplifier 156. The output of amplifier 142 provides a reset signal (/RES). Amplifiers 142 and 156 are illustratively from a LM339 Quad comparator chip available from Motorola.

The (+) input terminal of amplifier 156 is coupled through a 150K resistor 158 to ground. The (+) input terminal of amplifier 156 is also coupled to the cathode of a diode 160. The anode of diode 160 is coupled to the output of amplifier 122. The output of amplifier 156 is coupled through a 10K resistor 162 to the +5 V supply voltage. Output of amplifier 156 is also coupled through a 0.1 µF capacitor and a 100K resistor 166 to the +5 V supply voltage. The common terminal of capacitor 164 and resistor 166 is coupled to the anode of a diode 168. The cathode of diode 168 is coupled to the +5 V supply voltage. The common terminal of capacitor 164, resistor 166, and diode 168 is coupled to pin 10 of chip 136.

Pin 5 of chip 136 provides a shutdown signal (/SHUTDOWN) for the present invention. Shutdown signal from pin 5 controls a shutdown circuit 170 which cuts off power to the display, oven, or other heavy current drain portions of the vehicle driving monitor upon disconnection of power supply 84 from the monitor to permit data to be stored after the main power supply 84 is disconnected. As discussed above, comparator circuit 118 senses an input voltage drop below about +8 volts and triggers flip-flop 136 to provide an indicating signal for shutdown. After a time delay the rest signal is generated at the output of amplifier 142. Therefore, a proper power-up/power-down sequence is provided. In other words, the comparator circuit insures that shutdown will occur first. Once shutdown occurs, the system must reset to protect data from being corrupted. Pin 5 of chip 136 is coupled to the gate of FET 172. The source of FET 172 is coupled to ground. The drain of FET 172 is coupled to the gate of FET 174. The gate of FET 174 is coupled through a 10K resistor 176 to the +5 V supply voltage. The source of FET 174 is also coupled to the +5 V supply voltage. The drain of FET 174 is coupled to the inputs of regulators 178 and 180. Illustratively, FET 172 is a 2N7000 field effect transistor available from Motorola and FET 174 is a MTP 12PO5, TO-220 package available from Motorola. Illustratively, regulator 178 is a LM7805 regulator. Regulator 180 is illustratively a LM2930-5.0 regulator. The ground terminal of regulator 178 is coupled directly to ground. The ground terminal regulator 180 is coupled through a zener diode 182 to ground. The output of regulator 178 is coupled through a 0.1 µF capacitor 184 to ground. The output of regulator 178 provides a stable output voltage of +5 V. The output of regulator 180 is coupled through a 22 µF capacitor 186 to ground. The output of regulator 180 provides a stable +7.5 V supply voltage.

The drain of FET 174 is also coupled through a 10 ohm resistor 188 and a 10 µF capacitor 190 to ground. The common terminal of resistor 188 in capacitor 190 is coupled to pin 8 of a timer chip 192. Timer chip 192 is illustratively a NE555 surface mount DIP chip available from signetics. Pin 1 of chip 192 is coupled to ground. Pin 2 of chip 192 is coupled through a 0.01 µF capacitor 194 to ground. In addition, the common terminal of pin 2 of chip 192 and capacitor 194 is coupled through the series combination of a 10K resistor 196 and a 1K resistor 198 to the +5 V supply voltage. Pin 3 of chip 192 is coupled through a 15 µF capacitor to the anode of diode 202. The cathode of diode 202 is coupled to ground. The common terminal of capacitor 200 and diode 202 is coupled to the cathode of diode 204. The anode of diode 204 is coupled through a 10 µF capacitor 206 to ground. The common terminal of diode 204 and capacitor 206 is coupled to the input of a regulator 208. Illustratively, regulator 208 is a LM7905 regulator available from Motorola. The output of regulator 208 is coupled through a 0.1 µF capacitor 210 to ground. The output of regulator 208 provides a −5 V output voltage for the analog circuitry of the present invention.

Pin 4 of chip 192 is coupled to the gate of FET 172. Pin 5 is coupled through a 0.01 µF capacitor 212 to ground. Pin 6 is coupled to the common terminal of capacitor 194 and resistor 196. Pin 7 is coupled to the common terminal of resistor 196 and resistor 198.

Timer chip 192 is arranged in a charge pump configuration with capacitors 202 and 206 and diodes 202 and 204. Therefore, timer chip 192 provides a voltage multiplier and inverter which produces a −10 V signal at the input of regulator 208. Regulator 208 converts this −10 V supply to the −5 V output signal. When the input power from power source 84 drops below a preset level set by comparator 118 of about +8 V (indicating power to the monitor has been disconnected), flip-flop 136 generates an output signal at pin 5 to shutdown of the heavy current drain portions of the circuit. This shutdown signal from pin 5 of chip 136 causes the voltage output from regulators 178, 180, and 208 to be shutoff. Regulators 178, 180 and 208 are used to supply voltages to the circuits in FIGS. 1, 2 and 4–6. This shutdown provides power to permit microcontroller 314 to store its data when power is disconnected from the apparatus. The +5 V supply from regulator 101 is the only essential power supply and therefore doesn't turn on and off with the shutdown signal.

Diodes 94, 98, and 100 in FIG. 3 are illustratively 1N4001 silicon diodes. Diodes 154, 160, 168, 202 and 204 are illustratively 1N914 switching diodes.

Figure 4:
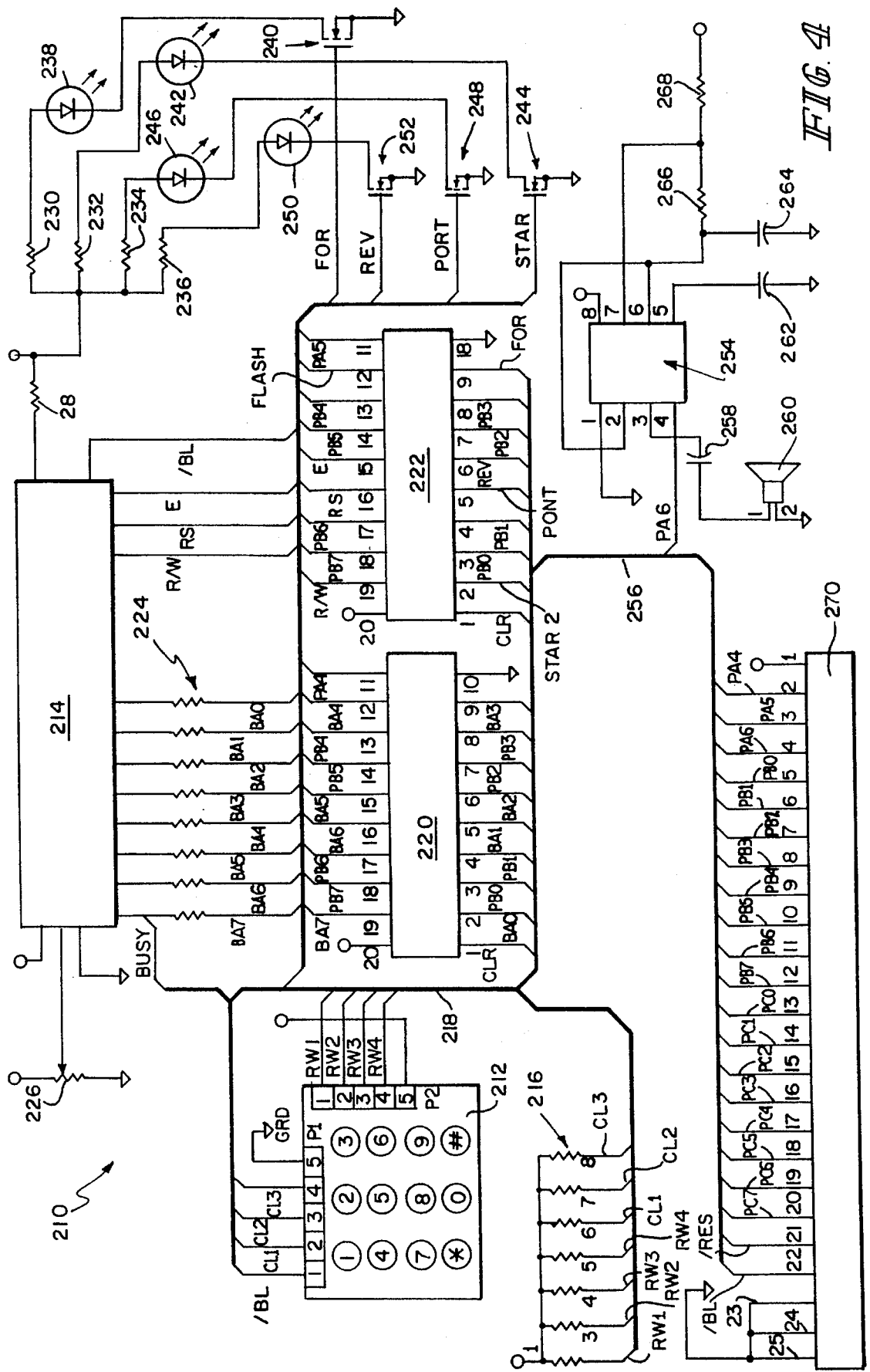
FIG. 4 is a schematic diagram illustrating a front panel interface circuit of the present invention.

Referring now to FIG. 4 of the drawings, a front panel interface circuit 210 includes a keypad 212 and a 2×16 LCD display unit 214. Keypad 212 is illustratively a 98-026-low key pad-01 available from Manutek, Inc. in Indianapolis, Ind. Display Unit 214 is illustratively a SIM 162 FXX SLC LE 009 display unit available from Standish. Keypad 212 has a standard telephone keypad for entering data into the monitor and for accessing various features of the monitor as discussed below in detail.

The CL1, CL2, CL3, RW1, RW2, RW3 and RW4 terminals of keypad 212 are coupled in parallel through resistor network 216 to a +5 V supply voltage. Each resistor in resistor network 216 is a 100K resistor. Heavy dark line 218 illustrates a bus line. A pair of demultiplexers 220 and 222 are coupled as latches to generate information and to supply the information to display 214. Illustratively, demultiplexers 220 and 222 are 74 HC 273 Surface Mount DIP chips available from Motorola.

Lines BA0–BA7 from chip 220 are coupled to the input ports of display 214. Pin 2 of display 214 is coupled to a +5 V supply voltage. Pin 3 of display 214 is coupled to the center tap of a 28K potentiometer 226. Pin 1 of display 224 is coupled to ground. Pin 5 of display 214 is coupled to the R/W line from pin 19 of chip 222. Pin 4 of display 214 is coupled to the RS line from pin 16 of chip 222. Pin 6 of display 214 is coupled to line E from pin 15 of chip 222. Pin 15 of chip 214 is coupled to the /BL line from FIG. 3. Pin 16 of chip 214 is coupled through a 220 ohm, ¼ W resistor 228 to the +5 V supply voltage. The common terminal of resistor 228 and +5 V supply voltage is coupled through the parallel combination of resistors 230, 232, 234 and 236. Each of the resistors 230, 232, 234 and 236 are 220 ohm, ⅛W resistors. Resistor 230 is coupled to the anode of LED 238. The cathode of LED 238 is coupled to the drain of FET 240. The source of FET 240 is coupled to ground. The gate of FET 240 is coupled to the forward (FOR) indicator signal from pin 9 of chip 222. This signal indicates an acceleration has been detected in the forward direction by a sensor 10. Therefore, LED 238 is illuminated when a forward acceleration is detected by the vehicle driving monitor of the present invention. Resistor 232 is coupled to the anode of LED 242. The cathode of LED 242 is coupled to the drain of FET 244. The source of FET 244 is coupled to ground. The gate of FET 244 is coupled to the starboard or right direction acceleration signal (STAR) from pin 2 of chip 222. Therefore, LED 242 is illuminated if a G-force is detected in the right direction.

Resistor 234 is coupled to the anode of LED 246. The cathode of LED 246 is coupled to the drain of FET 248. The source of FET 248 is coupled to ground. The gate of FET 248 is coupled to the port or left direction acceleration signal (PORT) from pin 5 of chip 222. Therefore, LED 246 is illuminated upon detection of a left direction G-force detected by the vehicle driving monitor of the present invention. Resistor 236 is coupled to the anode of LED 250. The cathode of LED 250 is coupled to the drain of FET 252. The source of FET 252 is coupled to ground. The gate of LED 252 is coupled to the reverse direction acceleration signal (REV) from pin 6 of chip 222. Therefore, LED 250 will be illuminated if a breaking force or reverse acceleration is detected by the vehicle driving monitor of the present invention. Illustratively, LEDs 238, 242, 246 and 250 are red T1 ¾ Jumbo LEDs available from Stanley. FETs 240, 244, 248 and 252 are illustratively 2N7000 field effect transistors available from Motorola. LEDs 238, 242, 246 and 250 provide a visual indication or warning when a G-force is detected in a particular direction. LEDs 238, 242, 246, and 250 are also used to level the Monitor. When all four LEDs 238, 242,246, and 250 are off during the leveling step, the monitor is level.

The present invention also has the capability of providing an audible indication or warning when the preset maximum G-force limit in a particular direction is exceeded. A NE555 timer chip 254 available from Signetics is provided. Timer 254 is a square wave generator. Line PA6 from bus line 256 is coupled to pin 4 of timer 254. Pin 1 is coupled to ground. Pin 2 is coupled to pin 6. Pin 3 of chip 254 is coupled through a 0.1 μF capacitor 258 to the first terminal of tone generator 260. A second terminal of tone generator 260 is coupled to ground. Illustratively, tone generator 260 is a sounder BRP2207P-30 device available from Intervox. Pin 5 of timer 254 is coupled through a 0.01 μF capacitor 262 to ground. Pin 6 is coupled through a 0.1 μF capacitor 264 to ground. Pin 6 is also coupled through the series combination of a 18K resistor 266 and a 2.2K resistor 268 to a +5 V supply voltage. Pin 7 of timer 254 is coupled to the common terminal of resistor 266 and resistor 268. Pin 8 of timer 254 is coupled to the +5 V supply voltage.

Tone generator 260 generates a single tone. However, the tone generator 260 may be turned on and off in different patterns to provide a first type warning signal when the driver is approaching a preset G-force limit and a second type warning signal when the driver actually exceeds the preset G-force limit.

Bus line 256 is also coupled to interconnection jack 270. Interconnection jack 270 is coupled to another interconnection jack 272 in FIG. 6.

Referring now to FIG. 5, first and second oven interfaces 274 and 276 are provided for maintaining the temperature of the two acceleration sensors 10 of the present invention above a maximum temperature inside the vehicle. Illustratively, oven interfaces 274 and 276 are 01-69-OVN-WRM oven interfaces available from Manutek, Inc. As discussed above, the temperature inside a vehicle can vary dramatically. Therefore ovens 274 and 276 are provided to house sensors 10. Without the ovens 274 and 276, ambient temperature fluctuations surrounding the apparatus can cause G-force signals from sensors 10 to become inaccurate. Therefore, ovens 274 and 276 maintain the temperature of sensors 10 at about 160° F.

First and second adjustments (ADJ1 and ADJ2) from sensor 10 inside oven 274 from lines 14 and 16 of FIG. 1 are coupled to opposite ends of a 100 ohm potentiometer 278. The center tap of potentiometer 278 is coupled to ground along with the ground terminal of oven 274. The feedback output (FBK) from FIG. 1 is coupled through a 0.1 μF capacitor 280 to the acceleration sensor output (ACC) also from FIG. 1. Capacitor 280 limits the frequency of response so that vehicle vibration effects will be limited. The acceleration sensor output (ACC) is coupled through a 1K resistor 282 to the (−) input terminal of operational amplifier 284. The output of operational amplifier 284 is coupled through a 1K resistor 286 to the (−) input terminal of amplifier 284. The output of amplifier 284 is also coupled to the (+) input terminal of amplifier 288. The (−) input terminal of amplifier 288 is coupled to ground. The output of amplifier 288 is coupled through the series combination of 10K resistor 290 and 10K resistor 292 to the +5 V supply voltage. Amplifier 288 is configured as a comparator.

The common terminal of resistor 290 and resistor 292 is coupled to a voltage compensation network 293. Voltage compensation network 293 includes a programmable logic device chip 294. Illustratively, chip 94 is an N85C060-50 available from Intel. A resistor network 296 is provided which functions as a digital to analog converter. The output from resistor network 296 is coupled to the (+) input terminal of an operational amplifier 298 which provides an input to an auto-zero circuit 299. The output of operational amplifier 298 is coupled to the (−) input terminal of amplifier 298. The output of amplifier 298 is also coupled through a 10K resistor 300 to the (−) input terminal of operational amplifier 302. The output of amplifier 302 is coupled through a 1K resistor 304 to the (−) input terminal of amplifier 302. The output of amplifier 302 is also coupled to the (+) input terminal of amplifier 284. The (+) input terminal of amplifier 302 is coupled through a 1K resistor 306 to ground. The (+) input terminal of amplifier 302 is also coupled through a 10K resistor 308 and a 1K resistor 310 to the −5 V supply voltage. The common terminal of resistor 308 and resistor 310 is coupled to the cathode of a 2.5 V zener diode 312. The anode of zener diode 312 is coupled to ground.

Figure 6:
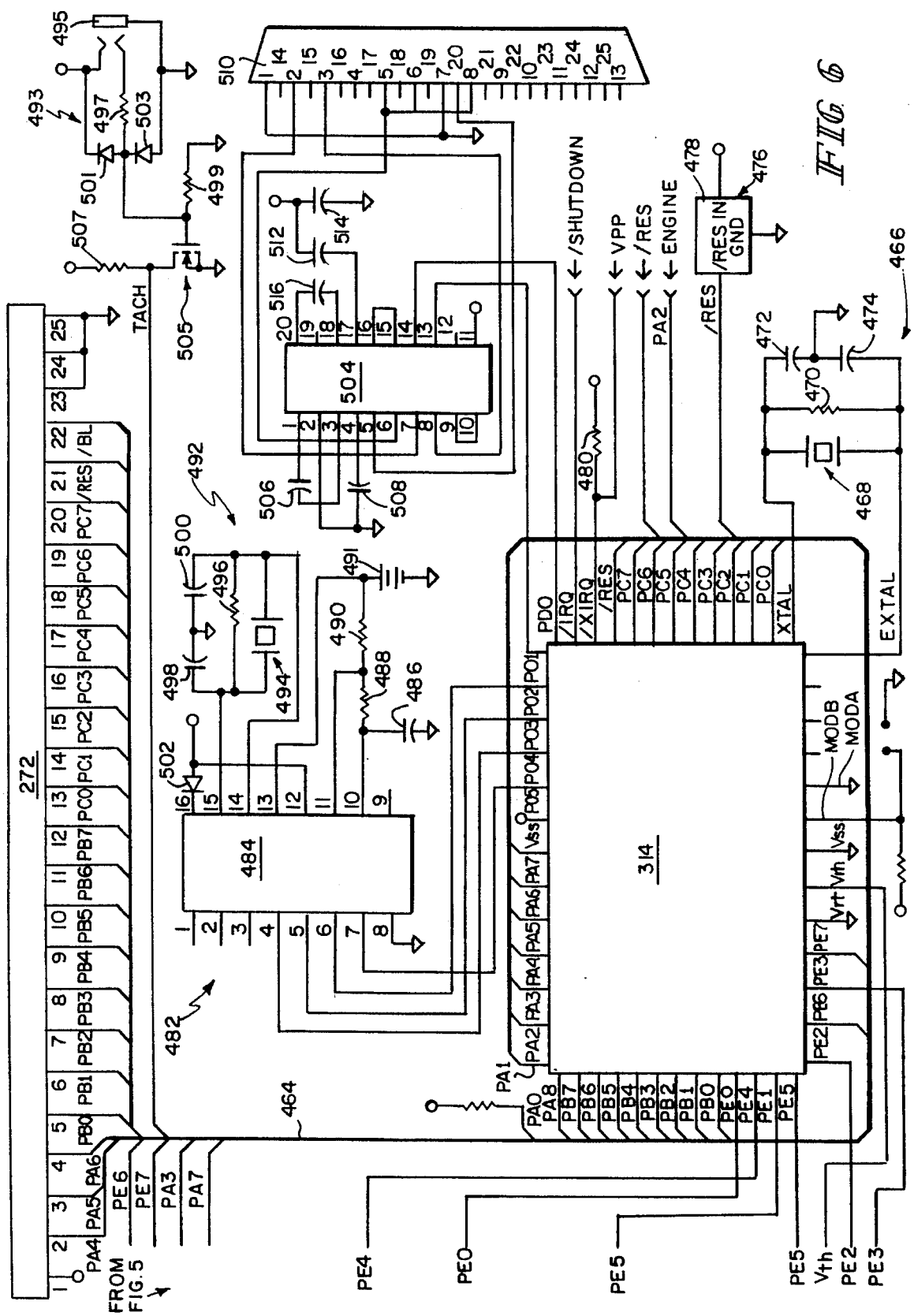
FIG. 6 is a schematic diagram illustrating a second portion of the processor interface circuitry of the present invention including a microcontroller, a real time clock, and a serial driver.

The clock signal (CLK) supplied to chip 294 is provided from line PA7 microcontroller 314 of FIG. 6. Illustratively, microcontroller 314 is a MC68HC711E9 microcontroller available from Motorola. A zero acceleration sensor network 316 illustrated in FIG. 5 controls the clocking signal to chip 294 of voltage compensation network 293. Zero acceleration sensor network 316 includes a tilt switch 318 having a first terminal coupled to ground and a second terminal coupled to the gate of FET 320. Illustratively, FET 320 is a 2N7000 field effect transistor available from Motorola. The source of FET 320 is coupled to ground. The second terminal of tilt switch 318 is coupled through the series combination of a 100K resistor 322, a 220K resistor 324 and a 10 μF capacitor 326 to ground. The drain of FET 320 is coupled through a 10K resistor 328 to the common terminal of resistor 324 and capacitor 326. The common terminal of resistor 322 and resistor 324 is coupled to the −5 V supply voltage. The common terminal of resistor 324, resistor 328, and capacitor 326 provide an output signal to an analog input at PE7 of microcontroller 314 which provides a zero acceleration signal. In other words, the output signal indicates when no acceleration is present. The RC filter coupled to tilt switch 318 slows the response and provides a predetermined time delay before the zero acceleration is indicated. This is because the zero acceleration may be indicated as tilt switch 318 moves through the zero point during a transition from a forward to a reverse acceleration. Voltage compensation network 293, auto-zero circuit 299, and zero acceleration sensor network 316 cooperate to remove any additional drift which may be present from the signal (ACC) from first sensor 10 despite oven 274.

Referring again to operational amplifier 284, the output of amplifier 284 is coupled through a 100K resistor 330 to the (−) input terminal of operational amplifier 332. The (+) input terminal of amplifier 332 is coupled to ground. The output of amplifier 332 is coupled through a 1M potentiometer 334 to the (−) input terminal of amplifier 332. The center tap of potentiometer 334 is also coupled to the (−) input terminal of amplifier 332. The output of amplifier 332 controls the gain of one direction G-force output signal. The direction is illustratively the reverse direction. The output of amplifier 332 is coupled to a perfect rectifier circuit 336. Perfect rectifier circuit 336 provides a signal which will not drop below zero volts. The perfect rectifier circuit 336 includes an operational amplifier 338 having its (+) input terminal coupled to the output of amplifier 332. The output of amplifier 338 is coupled to the anode of diode 340. The cathode of diode 340 is coupled through a 1K resistor 342 to ground. The common terminal of diode 340 and resistor 342 is coupled through a 10K resistor 344 and a 10K resistor 346 to ground. The common terminal of resistor 344 and resistor 346 is coupled to the (−) input terminal of amplifier 338. The common terminal of diode 340, resistor 342, and resistor 344 is coupled to analog input PE1 of microcontroller 314. This provides the reverse direction G-force signal to microcontroller 314.

The output of amplifier 284 is also coupled to a complementary direction gain control and perfect rectifier circuit 348. This circuit 348 provides an output circuit proportional to the acceleration in the complementary direction to amplifier 332. In other words, in this illustration, the output from circuitry 348 provides a forward direction G-force output signal. Control circuit 348 includes an operational amplifier 350, the (+) input terminal of which is coupled to the output of amplifier 284. The output of amplifier 350 is coupled to the anode of diode 352. The cathode of diode 352 is coupled through a 1K resistor 354 to ground. The common terminal of diode 352 and resistor 354 is coupled to a first terminal of a 100K potentiometer 356. The second terminal and the center tap of potentiometer 356 are coupled to the (−) input terminal of amplifier 350. The (−) input terminal of amplifier 350 is also coupled through a 10K resistor 358 to ground. The common terminal of diode 352, resistor 354 and potentiometer 356 provides the complementary output signal which is coupled to analog input PE0 of microcontroller 314. This provides a forward direction G-force signal to microcontroller 314.

The temperature output signal (TMP) from FIG. 2 from oven 274 is coupled to the (+) input terminal of operational amplifier 360. The output of amplifier 360 is coupled to the (−) input terminal of amplifier 360. Amplifier 360 provides an output buffer for the temperature signal from oven 274. The output of amplifier 360 is coupled to analog input PE4 of microcontroller 314. Therefore, microcontroller 314 can monitor the temperature of oven 274.

First and second adjustments (ADJ1 and ADJ2) from the second sensor 10 of the apparatus inside oven 276 from lines 14 and 16 of FIG. 1 are coupled to opposite ends of a 100 ohm potentiometer 378. The center tap of potentiometer 378 is coupled to ground along with the ground terminal of oven 276. The feedback output (FBK) from FIG. 1 is coupled through a 0.1 μF capacitor 380 to the acceleration sensor output (ACC) also from FIG. 1. Capacitor 380 limits the frequency of response so that vehicle vibration effects will be limited. The acceleration sensor output (ACC) is coupled through a 1K resistor 382 to the (−) input terminal of operational amplifier 384. The output of operational amplifier 384 is coupled through a 1K resistor 386 to the (−) input terminal of amplifier 384. The output of amplifier 384 is also coupled to the (+) input terminal of amplifier 388. The (−) input terminal of amplifier 388 is coupled to ground. The output of amplifier 388 is coupled through the series combination of 10K resistor 390 and 10K resistor 392 to the +5 V supply voltage. Amplifier 388 is configured as a comparator.

The common terminal of resistor 390 and resistor 392 is coupled to a voltage compensation network 393. Voltage compensation network 393 includes a PLD chip 394. Illustratively, chip 394 is a N85C060-50 available from Intel. A resistor network 396 is provided which functions as a digital to analog converter. The output from resistor network 396 is coupled to the (+) input terminal of an operational amplifier 398 which provides an input to an auto-zero circuit 399. The output of operational amplifier 398 is coupled to the (−) input terminal of amplifier 398. The output of amplifier 398 is also coupled through a 10K resistor 400 to the (−) input terminal of operational amplifier 402. The output of amplifier 402 is coupled through a 1K resistor 404 to the (−) input terminal of amplifier 402. The output of amplifier 402 is also coupled to the (+) input terminal of amplifier 284. The (+) input terminal of amplifier 402 is coupled through a 1K resistor 406 to ground. The (+) input terminal of amplifier 402 is also coupled through a 10K resistor 408 and a 1K resistor 410 to the −5 V supply voltage. The common terminal of resistor 408 and resistor 410 is coupled to the cathode of a 2.5 V zener diode 412. The anode of zener diode 412 is coupled to ground.

The clock signal (CLK) supplied to chip 394 is provided from line PA3 microcontroller 314 of FIG. 6. A zero acceleration sensor network 416 illustrated in FIG. 5 controls the clocking signal to chip 394 of voltage compensation network 393. Zero acceleration sensor network 416 includes a tilt switch 418 having a first terminal coupled to ground and a second terminal coupled to the gate of FET 420. Tilt switches 318 and 418 are "closed-on" level tilt switches available from Manutek. Illustratively, FET 420 is a 2N7000 field effect transistor available from Motorola. The source of FET 420 is coupled to ground. The second terminal of tilt switch 418 is coupled through the series combination of a 100K resistor 422, a 220K resistor 424 and a 10 μF capacitor 426 to ground. The drain of FET 420 is coupled through a 10K resistor 428 to the common terminal of resistor 424 and capacitor 426. The common terminal of resistor 422 and resistor 424 is coupled to the −5 V supply voltage. The common terminal of resistor 424, resistor 428, and capacitor 426 provide a signal to an analog input at PE6 of microcontroller 314 which provides a zero acceleration signal. In other words, the output signal indicates when no acceleration is present. The RC filter coupled to tilt switch 418 slows the response and provides a predetermined time delay before the zero acceleration is indicated. This is because the zero acceleration may be indicated as tilt switch 418 moves through the zero point during a transition from a right to a left acceleration. Voltage compensation network 393, auto-zero circuit 399, and zero acceleration sensor network 416 cooperate to remove any additional drift which may be present in the signal (ACC) from sensor 10 inside oven 276.

Referring again to operational amplifier 384, the output of amplifier 384 is coupled through a 100K resistor 430 to the (−) input terminal of operational amplifier 432. The (+) input terminal of amplifier 432 is coupled to ground. The output of amplifier 432 is coupled through a 1M potentiometer 434 to the (−) input terminal of amplifier 432. The center tap of potentiometer 434 is also coupled to the (−) input terminal of amplifier 432. The output of amplifier 432 controls the gain of one direction G-force output signal. The direction is illustratively the right direction. The output of amplifier 432 is coupled to a perfect rectifier circuit 436. Perfect rectifier circuit 436 provides a signal which will not drop below zero volts. The perfect rectifier circuit 436 includes an operational amplifier 438 having its (+) input terminal coupled to the output of amplifier 432. The output of amplifier 438 is coupled to the anode of diode 440. The cathode of diode 440 is coupled through a 1K resistor 442 to ground. The common terminal of diode 440 and resistor 442 is coupled through a 10K resistor 444 and a 10K resistor 446 to ground. The common terminal of resistor 444 and resistor 446 is coupled to the (−) input terminal of amplifier 438. The common terminal of diode 440, resistor 442, and resistor 444 is coupled to analog input PE3 of microcontroller 314. This provides the right direction G-force signal to microcontroller 314.

The output of amplifier 384 is also coupled to a complementary direction gain control and perfect rectifier circuit 448. This circuit 448 provides an output circuit proportional to the acceleration in the complementary direction to amplifier 432. In other words, in this illustration, the output from circuitry 448 provides a left direction G-force output signal. Control circuit 448 includes an operational amplifier 450, the (+) input terminal of which is coupled to the output of amplifier 384. The output of amplifier 450 is coupled to the anode of diode 452. The cathode of diode 452 is coupled through a 1K resistor 454 to ground. The common terminal of diode 452 and resistor 454 is coupled to a first terminal of a 100K potentiometer 456. The second terminal and the center tap of potentiometer 456 are coupled to the (−) input terminal of amplifier 450. The (−) input terminal of amplifier 450 is also coupled through a 10K resistor 458 to ground. The common terminal of diode 452, resistor 454 and potentiometer 456 provides the complementary output signal which is coupled to analog input PE2 of microcontroller 314. This provides a left direction G-force signal to microcontroller 314.

The temperature output signal (TMP) from FIG. 2 from oven 276 is coupled to the (+) input terminal of operational amplifier 460. The output of amplifier 460 is coupled to the (−) input terminal of amplifier 460. Amplifier 460 provides an output buffer for the temperature signal from oven 276. The output of amplifier 460 is coupled to analog input PE5 of microcontroller 314. Therefore, microcontroller 314 can monitor the temperature of oven 276.

Pin 4 of oven 276 is coupled through a 10K potentiometer 461 to ground. The center tap of potentiometer 461 is coupled to the Vth of microcontroller 314.

Referring now to FIG. 6, a bus line 464 is provided for interconnecting terminals of the various components as illustrated. Interconnection jack 272 is coupled to the interconnection jack 270 in the front panel circuit 210 of FIG. 4. Jacks 270 and 272 provide a communication link between front panel circuit 210 and microcontroller circuit 214. Lines on the right hand side of FIG. 5 are coupled to lines on the left hand side of FIG. 6 as indicated.

An 8 MHz clock 466 is coupled across the XTAL and the EXTAL ports of microcontroller 314. Clock 466 includes an 8 MHz crystal oscillator 468 coupled in parallel with a 10M resistor 470 which is coupled in parallel to the series combination of 20 pF capacitor 472 and 20 pF capacitor 474. The common terminal of capacitor 472 and capacitor 474 is coupled to ground. The 8M Hz clock signal is divided by 4 within microcontroller 314 to provide a 2 MHz internal clock signal within microcontroller 314. A reset generator 476 is provided to provide a reset when the voltage drops below +3V. Reset generator includes a voltage regulator 478. Illustratively, reset generator voltage regulator is a MC34064P (TO-92) regulator available from Motorola. When voltage drops below about +3 V, regulator 478 continues to hold the reset signal low.

The ENGINE signal from FIG. 3 is coupled to port PA2 of microcontroller 314. The /RES reset signal from FIG. 3 is coupled to the /RES port of microcontroller 314. The VPP signal is coupled to the XIRQ port of microcontroller 314. The/XIRQ port is also coupled through a 10K resistor 480 to the +5 V supply voltage. The/SHUTDOWN signal from FIG. 3 is coupled to the/IRQ port of microcontroller 314.

A real time clock circuit 482 is provided to detect the amount of time that the power is disconnected from the vehicle driving monitor. This feature detects when a driver disconnects the vehicle driving monitor from power supply 84, thereby preventing the monitor from recording excessive G-forces during operation of the vehicle. An owner of the vehicle can view the total amount of time that power was disconnected. In addition, a counter determines the number of times that power was disconnected.

Clock circuit 482 includes a 68HC68TI real time clock chip 484 available from Motorola. Pin 4 of chip 484 is coupled to PD4 of microcontroller 314. Pin 5 of chip 484 is coupled to PD3, pin 6 is coupled to PD2, and pin 7 is coupled to PD5. Pin 8 of chip 484 is coupled to ground. Pin 10 of chip 484 is coupled through a 0.1 µF capacitor 486 to ground. Pin 11 is coupled through a 10K resistor 488 to pin 10. Pin 11 is also coupled through a 10K resistor 490 to pin 13. Pin 12 is coupled to a +5 V supply voltage. Pin 13 is coupled to a +3 V battery 491. Battery 492 powers clock chip 484 when power is disconnected from the apparatus. Pin 14 and pin 15 of chip 484 are coupled in parallel to an oscillator circuit 492. Oscillator circuit includes the parallel combination of a 32.768 KHz crystal oscillator 494. Oscillator 494 is coupled in parallel with a 22M resistor 496 and with the series combination of a 10 pF capacitor 498 and a 10 pF capacitor 500. The common terminal of capacitor 498 and capacitor 500 is coupled to ground. Pin 16 of chip 484 is coupled to the cathode of diode 502. The anode of diode 502 is coupled to the +5 V supply voltage.

A serial driver chip 504 is also coupled to microcontroller 314. Illustratively, serial driver chip 504 is an MC145407 Interface chip available from Motorola. Pin 1 of chip 504 is coupled through a 10 µF capacitor 506 to pin 3. Pin 2 of chip 504 is coupled to ground. Pin 4 is coupled through a 10 µF capacitor 508 to ground. Pin 5 is coupled to pin 20 of a DB-25 RS-232 computer interface port 510. Pin 6 of chip 504 is coupled to pin 5 of port 510. Pin 7 of chip 504 is coupled to pin 2 of port 510. Pin 8 of chip 504 is coupled to pin 3 of port 510. Pin 9 of chip 504 is coupled to pin 10 of chip 504. Pin 11 of chip 504 is coupled to the +5 V supply voltage. Pin 13 of chip 504 is coupled to PD1 of microcontroller 314. Pin 14 of chip 504 is coupled to port PD0 of microcontroller 314. Pins 15 and 16 of chip 504 are coupled together. Pin 17 of chip 504 is coupled through a 10 µF capacitor 512 and a 0.1 µF capacitor 514 to ground. The common terminal of capacitor 512 and capacitor 514 is coupled to the +5 V supply voltage. Pin 18 of chip 504 is coupled through a 10 µF capacitor 516 to pin 20 of chip 504. Pins 1 and 7 of port 510 are coupled to ground. Pins 6 and 8 are coupled to pin 5 of port 510.

Expansion circuit 493 provides an additional circuit for coupling a speed sensor or tachometer 495 to microcontroller 314. A first terminal of sensor 495 is coupled to the −5

V supply voltage. A second terminal of sensor 495 is coupled to ground. The second terminal of sensor 495 is also coupled through a 4.7K resistor 497 and a 100K resistor 499 to ground. The common terminal of resistor 497 and 499 is coupled to anode of diode 501. The cathode of diode 501 is coupled to the −5 V supply voltage. The common terminal of resistor 497 and resistor 499 is also coupled to the cathode of diode 503. The anode of diode 503 is coupled to ground. The common terminal of resistor 497, resistor 499, diode 501, and diode 503 is coupled to the gate of FET 505. The source of FET 505 is coupled to ground. The drain of FET 505 is coupled through a 10K resistor 507 to the −5 V supply voltage. The drain of FET 505 provides the output signal (TACH) which is supplied to port A of microcontroller 314. Illustratively, FET 505 is a 2N7000 field effect transistor available from Motorola.

Figure 7A:
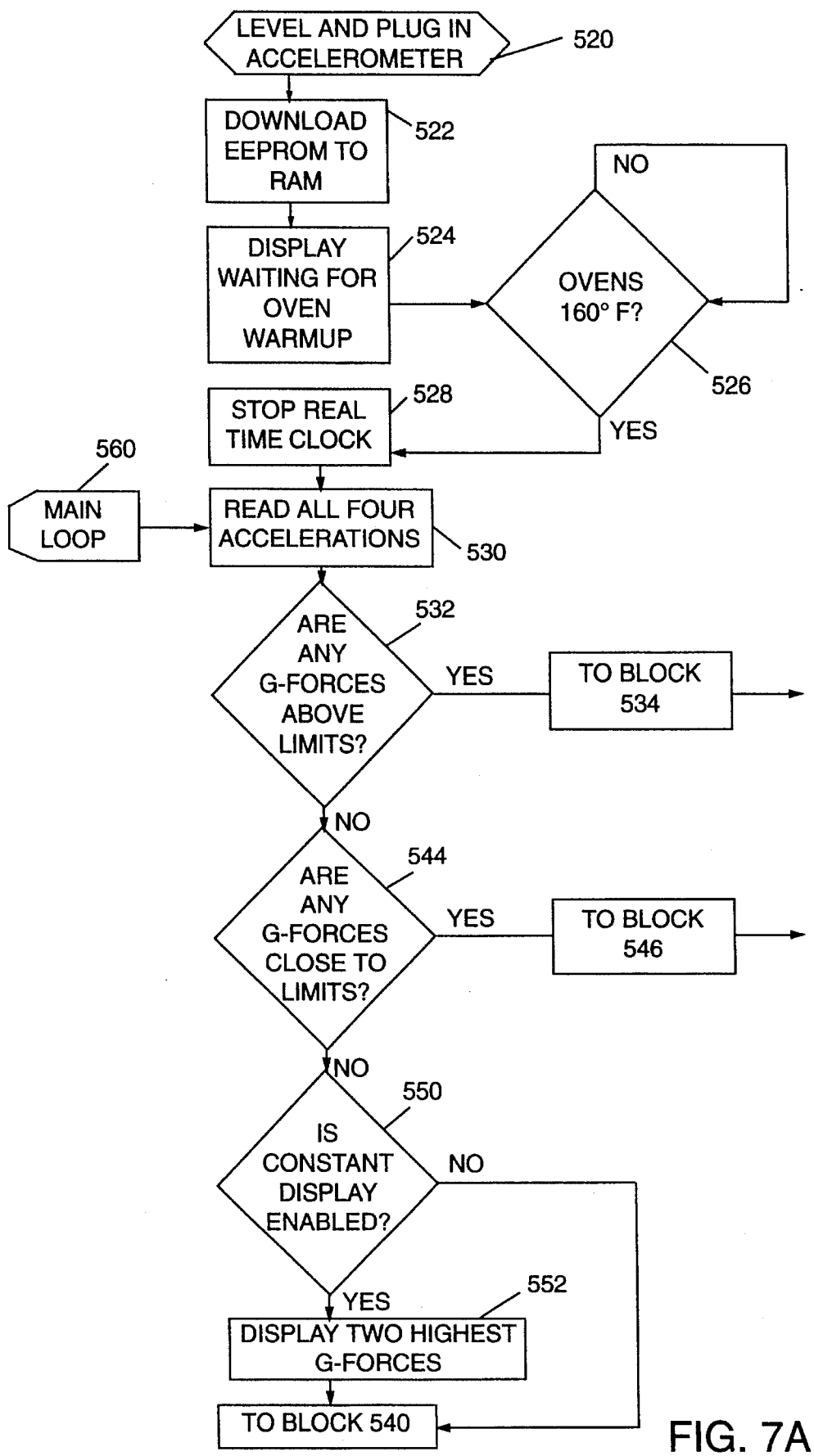
FIG. 7 is a flow chart of the steps performed when the power is initially supplied to the apparatus or reset and during normal operation of the vehicle driving monitor.
Figure 7B:
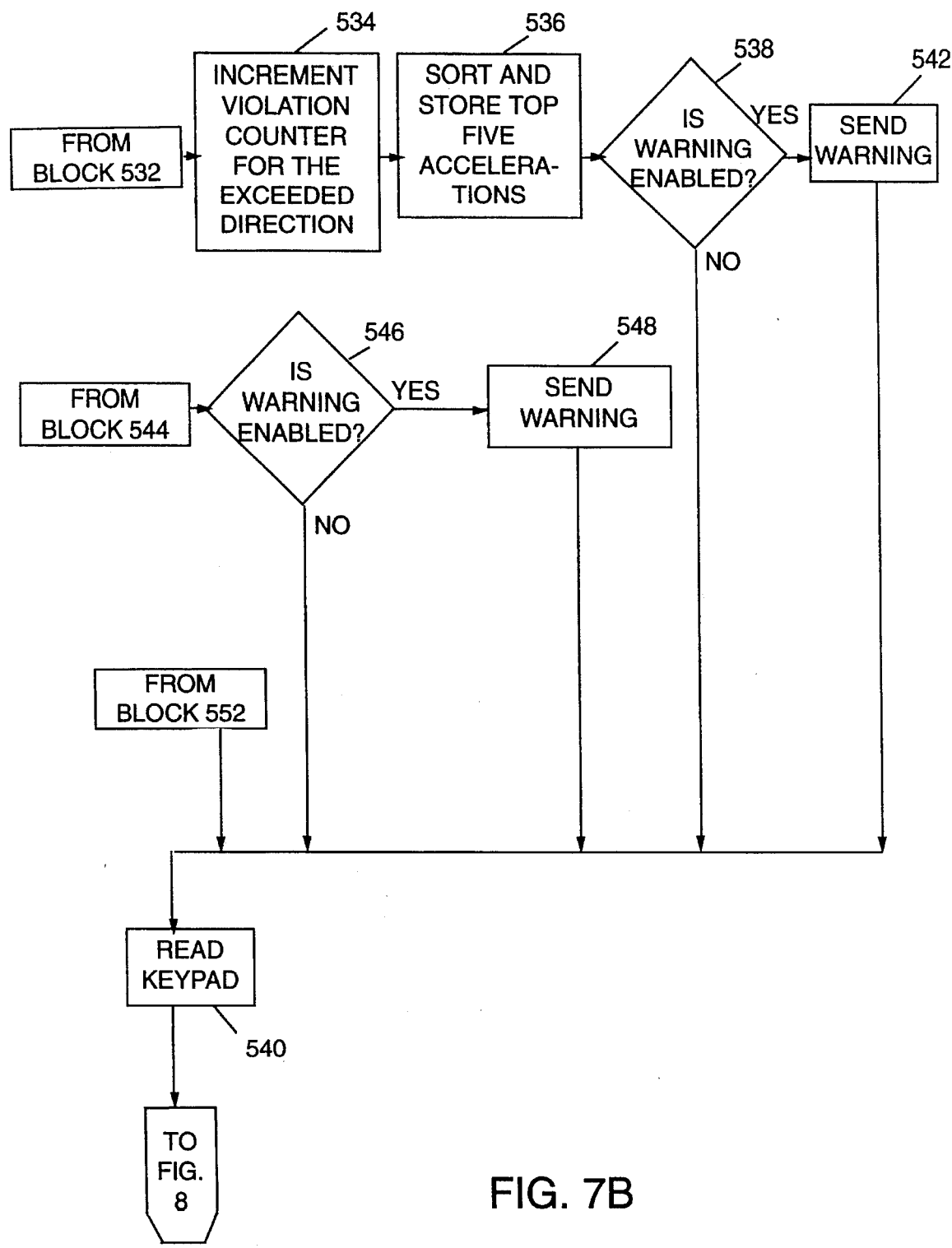

Operation of the vehicle driving monitor of the present invention will be explained with reference to FIGS. 2–22 which provide flow charts of the software for controlling the steps performed by microcontroller 314 to process information from the acceleration sensors 10 and from keypad 212. As illustrated in FIG. 7, the vehicle driving monitor is first leveled and plugged in or connected to power supply 84 as illustrated at block 520. Once all four LEDs 238, 242, 246 and 250 in FIG. 4 shut off, the monitor is level. Memory stored in the EEPROM of microcontroller 314 is downloaded into the RAM of microcontroller 314 at block 522. Display 214 displays the message "Waiting for Oven Warmup" at block 524. Microcontroller 314 determines whether the temperature of oven 274 and oven 276 is at 160° F. at block 526. If the oven temperature of either oven 274 or 276 is below 160° F., microcontroller 314 waits until the temperatures reach 160° F. Once both oven temperatures reach 160° F., microcontroller 314 stops the real time clock 482 which indicates the amount of time that power was disconnected from the vehicle driving monitor at block 528. The temperature signals from ovens 274 and 276 are supplied to PE4 and PE5, respectively, of microcontroller 314 as indicated in FIGS. 5 and 6.

The main loop begins at block 530. All four acceleration signals (forward, reverse, left, right) from the two acceleration sensors 10 are read at block 530. The four acceleration signals are supplied to PE0–PE3 of microcontroller 314 as illustrated in FIGS. 5 and 6.

Microcontroller 314 determines at block 532 whether any of the G-forces from the acceleration signals are above a preset limit set by the owner at block 532. If one of the G-forces is above the preset limit, microcontroller 314 increments a violation counter for the exceeded direction at block 534. Separate counters keep track of the number of times that a G-force limit is exceeded for each of the four directions. Microcontroller 314 then sorts and stores the top five accelerations which exceed the preset limit for the particular direction at block 536. These G-force values are stored in the internal memory of microcontroller 314. Microcontroller 314 determines whether the owner has set up the vehicle driving monitor so that the driver is to be warned if a violation occurs as illustrated at block 538. The owner can set up the monitor so that no warning is given to the driver, despite a violation of a preset G-force limit. If the warning is not enabled, microcontroller 314 advances to block 540 without sending a warning. If the warning is enabled, a warning indication is sent at block 542. The warning signal may be sent to display 214, to the selected direction indicating LED 238, 242, 246 or 250 for the exceeded direction, or to tone generator 260. Microcontroller 314 then advances to block 540.

If none of the four G-force signals are above the preset limits at block 532, microcontroller 314 then determines whether any of the G-force signals are close to the limit at block 544. The vehicle driving monitor of the present invention has the capability of providing a warning to the driver when the G-force in a particular direction is within a predetermined percentage or amount of the maximum preset level set by the owner. This gives the driver time to correct the driving condition without violating the predetermined limit. In the present invention the warning indicator is set 0.05 G below the preset G-force limit. In another embodiment, the warning could be triggered within a certain percentage of the maximum G-force level (preferably 5% −10% below preset limit). If the G-force reading in any of the four directions is within 0.05 G of the preset limit for that particular direction, microcontroller 314 determines if the driver warning has been enabled by the owner at block 546. If the warning has been enabled, microcontroller 314 sends the warning at block 348. Again, the warning can be generated by display 214, LEDs 238, 242, 246 or 250, or tone generator 260. Microcontroller 314 then proceeds to block 540. A different tone a series of tones is sent to tone generator for the warning below the preset level than for the warning when the preset limit is actually exceeded. Therefore, the driver hears a first type warning signal from tone generator 260 when the G-force level is within about 0.05 G below the preset G-force limit. The driver hears a second type warning signal from tone generator 260 when the G-force level exceeds the preset G-force limit. If the driver warning is not enabled, microcontroller 314 advances to block 540 without sending any warning signals.

If none of the G-force acceleration signals are close to the preset limit at block 544, microcontroller 314 determines whether the constant display is enabled at block 550. Block 550 determines if the forward, reverse, left or right display has been selected. Selection is controlled by the driver. However, this driver option can be disabled by the owner if desired. If the constant display is not enabled, microcontroller 314 proceeds to block 540. If the constant display is enabled, the two highest G-force readings in the selected direction are displayed on display 214 as illustrated at block 552.

Microcontroller 314 checks to determine if a key on keypad 212 was pressed at block 540. If a key was pressed, microcontroller 314 reads an input from keypad 212 at block 540. If no key is pressed, microcontroller 314 does not wait, and proceeds to block 554 illustrated in FIG. 8. The input from keypad 212 corresponds to the following functions:

| KEY PRESSED | FUNCTION |
| --- | --- |
| 1 | Visual Warning On |
| 2 | View Forward Accelerations |
| 3 | Audible Warning On |
| 4 | View Left Accelerations |
| 5 | View Highest Accelerations |
| 6 | View Right Accelerations |
| 8 | View Reverse Accelerations |
| 0 | Disable All Warnings |
| @ | Clear Password Buffer |

Figure 8:
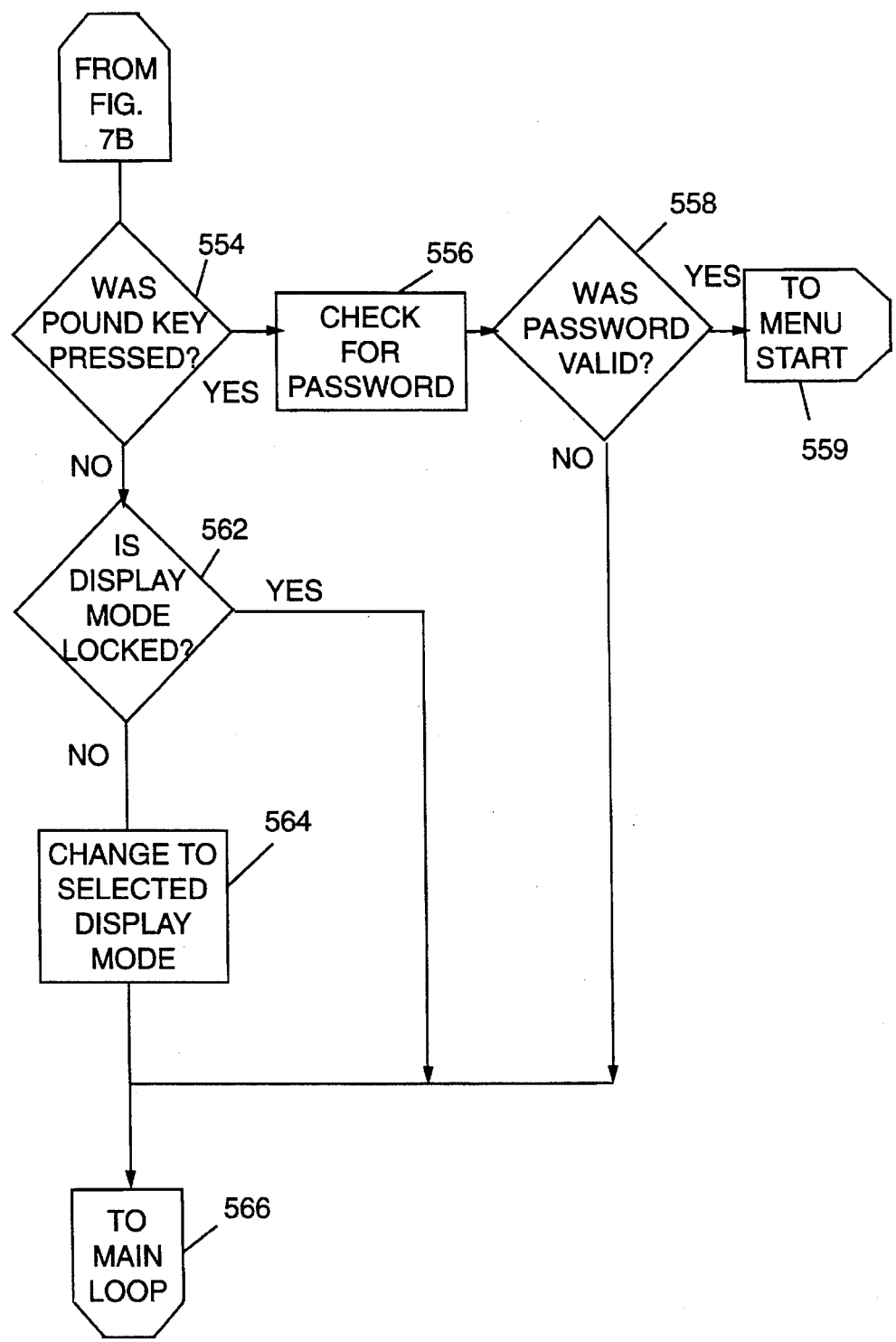
FIG. 8 is a flow chart illustrating additional steps performed during normal operation of the acceleration monitor.
Figure 9:
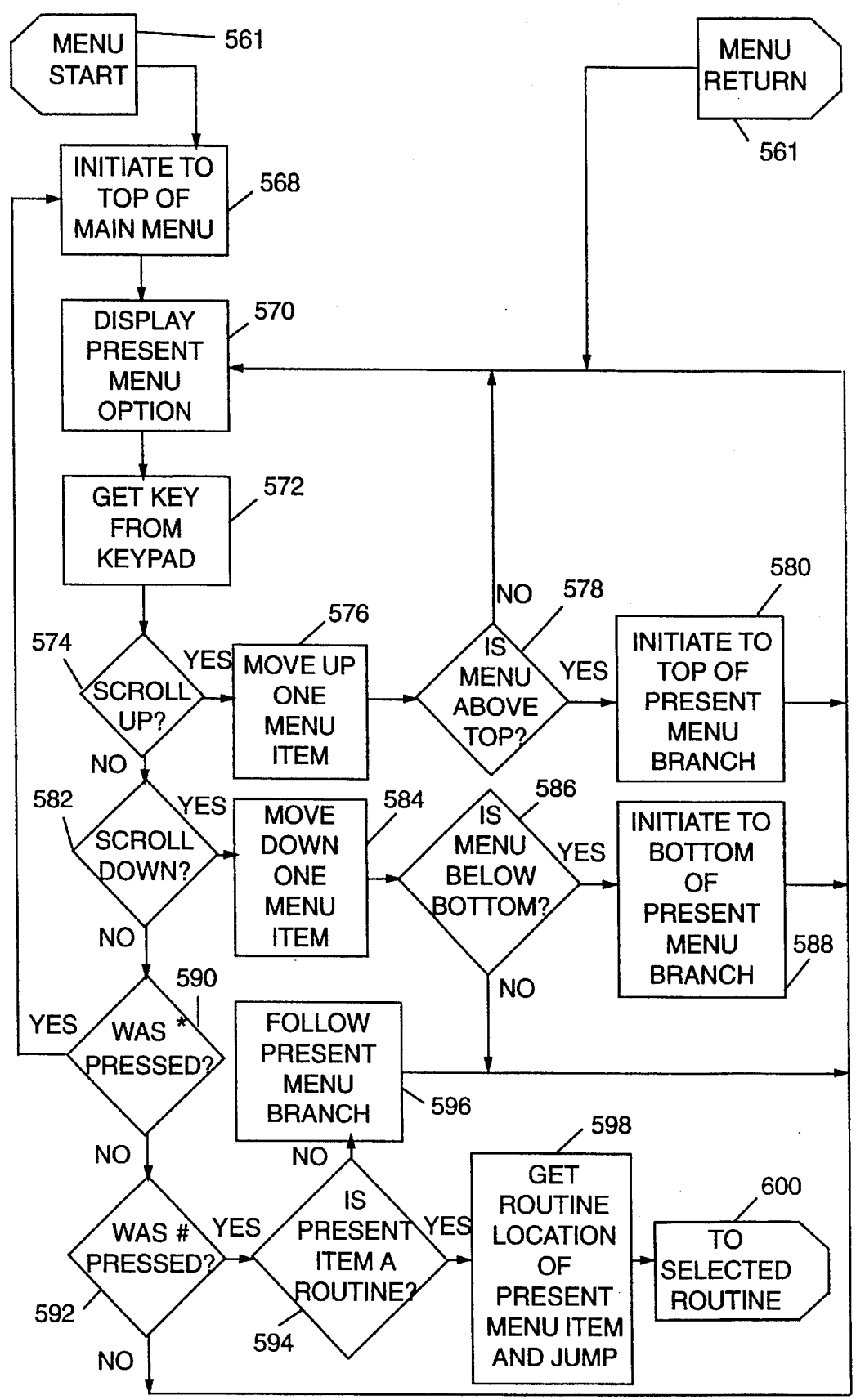
FIG. 9 is a flow chart illustrating the steps performed by the acceleration monitor during menu branch control and subroutine activation.

Microcontroller determines whether the pound (#) key was pressed at block 554 of FIG. 8. If the pound key was pressed on keypad 212, microcontroller 314 checks for the password at block 556. Microcontroller 314 then determines whether the password is valid at block 558. If the password is valid, microcontroller 314 advances to "Menu Start" as illustrated by block 559 to proceed to the main menu. Menu Start is illustrated by block 561 in FIG. 9. If the password is invalid at block 558, microcontroller 314 advances to the main loop as illustrated at block 566 and returns to block 560 of FIG. 7.

If the pound key was not pressed at block 554, microcontroller 314 determines whether the display mode has been locked by the owner at block 562. If the display mode is locked, microcontroller 314 advances to the main loop at block 560 of FIG. 7. If the display mode is not locked at block 562, microcontroller 314 changes to the display mode selected from keypad 212 by the driver at block 564. Microcontroller 314 then advances to the main loop at block 560 of FIG. 7 as indicated by block 566.

In the menu of the present invention, one routine does all the work. The main menu goes through many submenus by changing its data or changing where it is looking for data stored in the memory of microcontroller. Microcontroller 314 initiates to the top of main menu at block 568. The present menu option is displayed on display 214 at block 570. Microcontroller 314 reads a key pressed on keypad 212 at block 572. Microcontroller 314 determines whether the "scroll up" key was pressed at block 574. Illustratively, the scroll up key is key number 2 on the keypad 212 of the present invention. If the scroll up key is pressed, microcontroller 314 moves up one menu item at block 576. Microcontroller 314 determines whether the menu is above the top menu item at block 578. If the menu item is not above the top menu item, microcontroller returns to block 570 and displays the newly selected menu option on display 214. If the menu item is above the top, microcontroller moves to the top of the present menu branch at block 580. Microcontroller 314 then moves to block 570.

If the scroll up key was not pressed at block 574, microcontroller 314 determines whether the scroll down key was pressed at block 582. Illustratively, the scroll down key is key 8 of the keypad 212 of the present invention. If the scroll down key was pressed, microcontroller moves down one menu item as illustrated at block 584. Microcontroller 314 then determines whether the menu item is below the bottom of the menu at block 586. If the menu item is not below the bottom, microcontroller advances to block 170 to display the newly selected menu option on display 214. If the menu item is below the bottom, microcontroller 314 initiates to the bottom of the present menu branch at block 588. Microcontroller 314 then moves to block 570.

If the scroll down key was not pressed at block 582, microcontroller 314 determines whether the asterisk key was pressed on keypad 212 as illustrated at block 590. The asterisk key (*) is a signal to return to the top of main menu. If the asterisk key was pressed, microcontroller advances to block 568 to initiate to the top of the main menu. If the asterisk key was not pressed, microcontroller 314 determines whether the pound key was pressed at block 584. If the pound key was not pressed, microcontroller advances to block 570. If the pound key was pressed, microcontroller 314 determines whether the present item is a routine at block 594. If the present item is not a routine, microcontroller follows the present menu branch at block 596 and advances to block 570. If the present item is a routine at block 594, microcontroller reads the memory location of the routine and advances to that location at illustrated at block 598. Microcontroller then performs the selected routine at illustrated at block 600.

Figure 10:
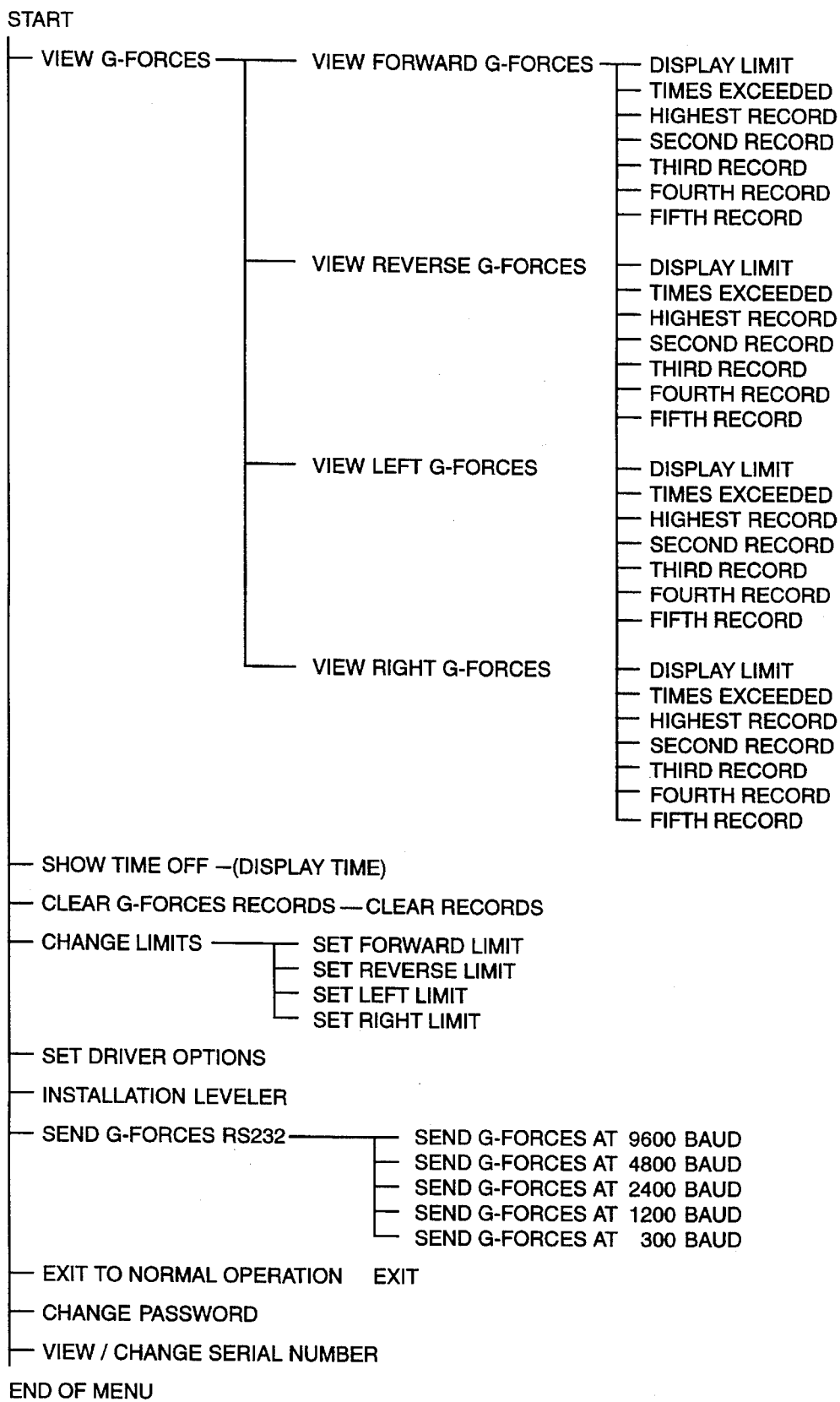
FIG. 10 is a table providing a menu branch tree and subroutine listing for the software control features of the present invention.

FIG. 10 illustrates the menu branch tree and subroutine listing for the present invention. Each of the routines is listed in the far left column adjacent dotted vertical line 602.

Subroutines are listed by dotted vertical lines 604. The routines include view G-forces, show time off, clear G-force records, change G-force limits, set driver options, installation leveler, send G-forces to the RS 232 port, exit to normal operation, change password, and view/change serial number. Within the routines, several subroutines are available. For instance under the view G-forces routine, the G-forces in the forward direction, reverse direction, left direction, and right direction can be sequentially displayed. For each of the four directions, the preset maximum G-force limit for that particular direction can be displayed, the number of times the preset limit was exceeded can be displayed, and the top five highest stored values exceeding the preset limit for the particular direction can also be displayed.

If it is desired to scroll through each of the subroutines using the scroll down key, microcontroller 314 would first view the forward G-forces, by displaying the preset forward limit, the number of times the preset limit for the forward direction was exceeded, the highest record, the second highest record, the third highest record, the fourth highest record and then the fifth highest record. On the next scroll down key, microcontroller 314 moves to view the reverse G-forces and then displays the reverse limit, the times the reverse limit was exceeded, etc. After the fifth record for the right G-force sensor is viewed, a scroll down key would move to the show time off routine illustrated in FIG. 10.

Figure 11:
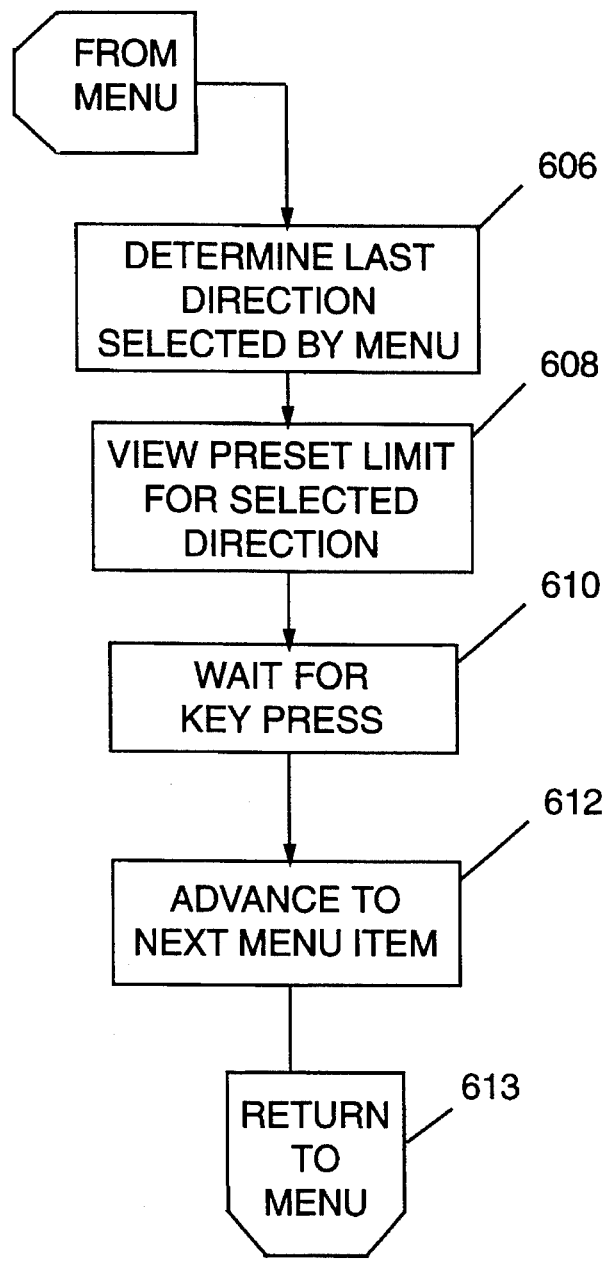
FIG. 11 is a flow chart illustrating the steps performed by the acceleration monitor for viewing a preset maximum G-force for a particular direction.
Figure 12:
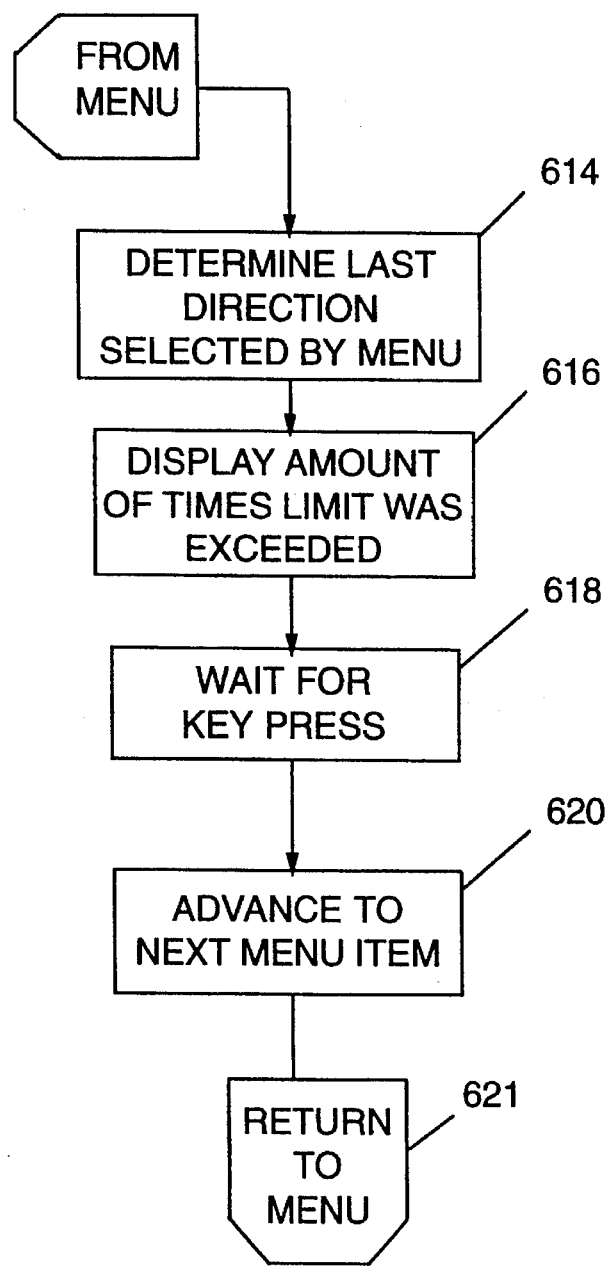
FIG. 12 is a flow chart illustrating the steps performed by the vehicle driving monitor to display the number of times that the preset limit for the particular direction was exceeded by a driver.
Figure 13:
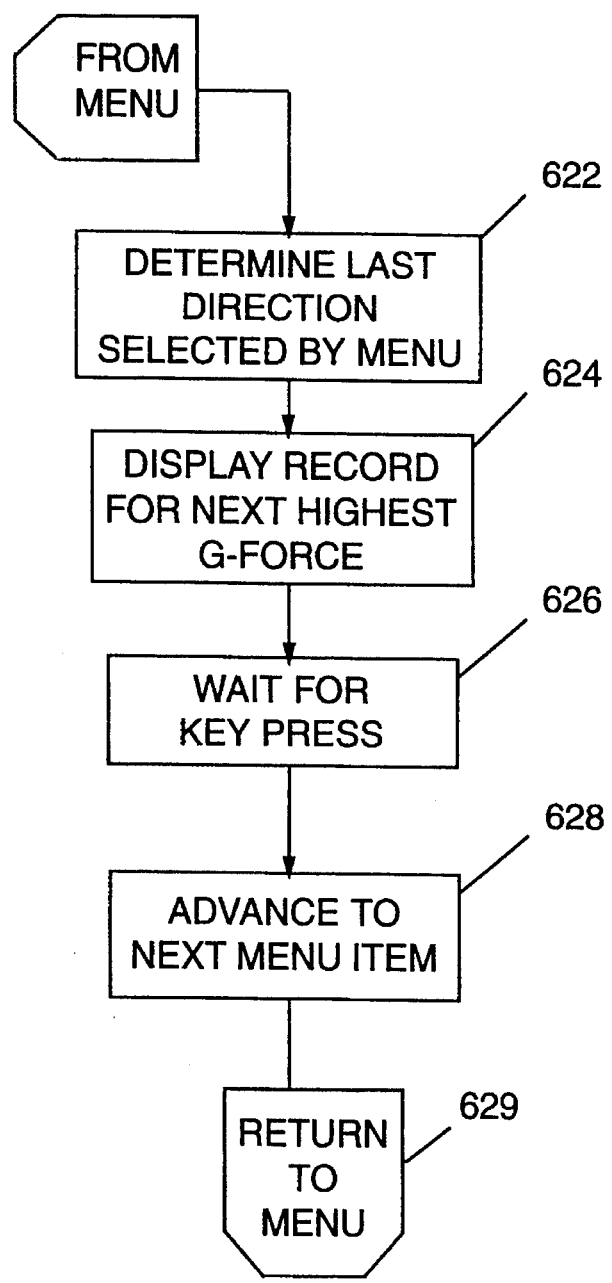
FIG. 13 is a flow chart illustrating the steps performed by the vehicle driving monitor to display the top four highest values which exceeded the preset limit for a particular direction.

FIGS. 11–22 illustrate the steps performed by microcontroller 314 while executing the various routines and subroutines illustrated in FIG. 10. FIGS. 11–13 illustrate the steps performed by microcontroller 314 to scroll through the items under the "view G-forces" routine discussed above. In FIG. 11, microcontroller determines the last direction selected at block 606. In other words, microcontroller 314 determines whether the forward direction, reverse direction, left direction, or right direction was the last direction selected. This directs microcontroller to a memory location for the preset limit in the selected direction. The preset limit for the particular selected direction is displayed at block 608. Microcontroller 314 waits for a key press at block 610 and advances to the next menu item at block 612. Microcontroller 314 then returns to the main menu at block 601 of FIG. 9 as illustrated at block 613.

FIG. 12 illustrates the steps performed by microcontroller 314 to display the number of times the preset limit for a particular direction was exceeded. Microcontroller 314 determines the last direction selected by the menu at block 614. Again, once the direction is determined, the memory location for the stored counter memory for the number of times that the preset limit was exceeded for the selected direction is determined. Microcontroller then displays the number of times that the limit was exceeded for the selected direction at block 616 and waits for a key press at block 618. Microcontroller 314 advances to the next menu item at block 620. Microcontroller 314 then returns to the main menu at block 601 of FIG. 9 as illustrated at block 629.

FIG. 13 illustrates the steps performed by microcontroller 314 to display the highest recorded G-force value which exceeded the limit in a particular direction. Microcontroller 314 determines the last direction selected by menu at block 622. Microcontroller then displays the record for the highest recorded G-force exceeded the preset limit at block 624. Microcontroller 314 then waits for a key press at block 626 and advances to the next menu item at block 628. Microcontroller 314 then returns to the main menu at block 601 of FIG. 9 as illustrated at block 629. FIG. 13 is used to display the highest, second highest, third highest, and fourth highest records for the G-forces which exceed the preset maximum G-force limit in each direction. Since after the fifth highest record is displayed, microcontroller 314 must advance to another memory location to display the G-forces for the next direction, a new series of steps is provided to display the fifth highest recorded G-force value for the particular direction.

Figure 14:
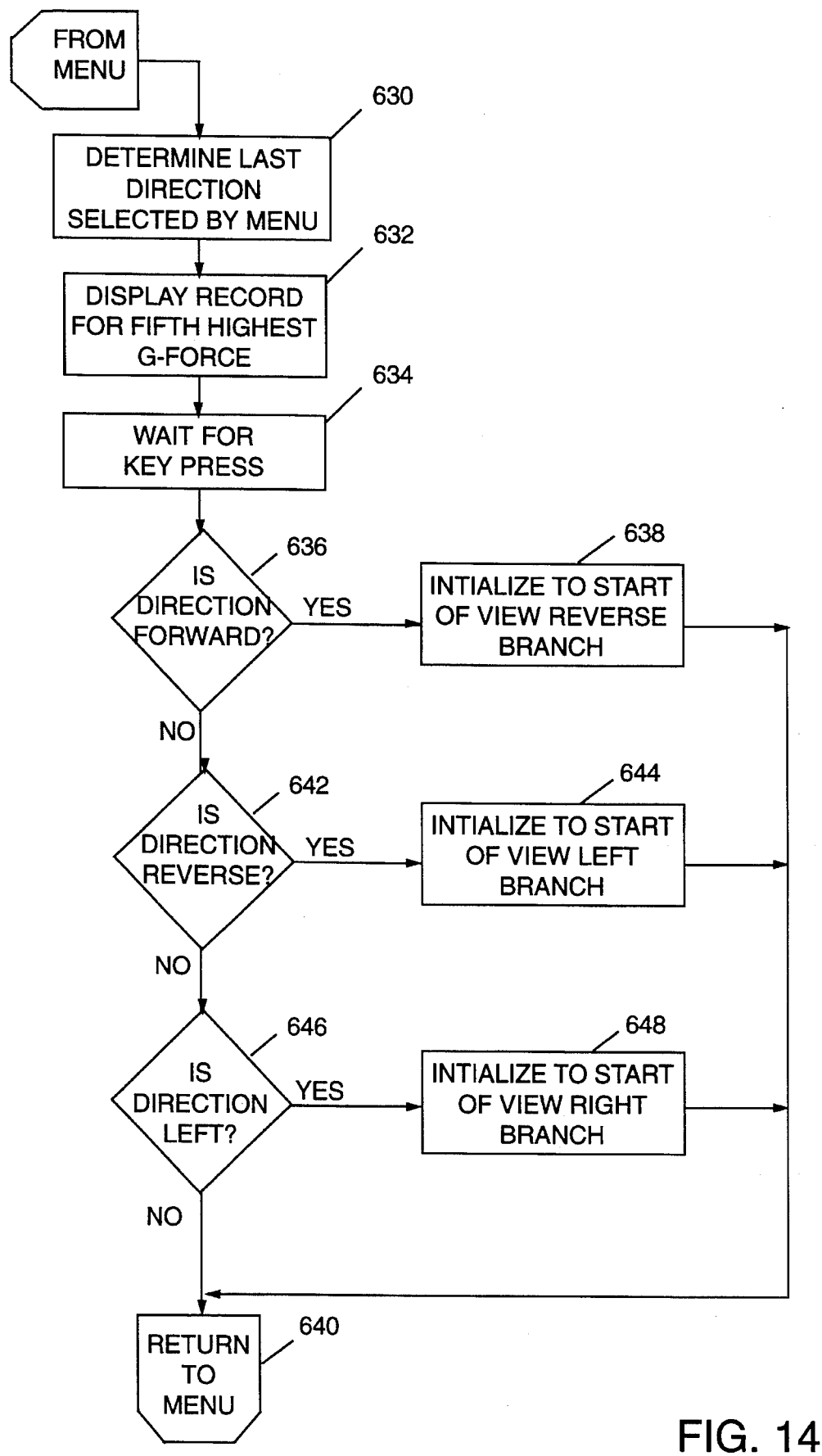
FIG. 14 is a flow chart illustrating the steps for displaying the fifth highest recorded value for a particular direction and then for proceeding to the next direction and returning to FIGS. 11–13 to display the preset limit, the number of times exceeded, and the five highest values exceeding the preset limit for each of the four measurement directions.

As illustrated in FIG. 14, microcontroller 314 determines the last direction selected by the menu at block 630. Microcontroller then displays the record for the fifth highest G-force reading in that particular direction which exceeded the preset limit at block 632. Microcontroller 314 waits for a key press at block 634. After a key is pressed, microcontroller 314 determines whether the present direction is the forward at block 636. If the direction is forward, microcontroller 314 initializes to start viewing reverse branch subroutine illustrated in FIG. 10. This step is illustrated by block 638 of FIG. 14. Microcontroller 314 then returns to the menu at block 640.

If the direction is not forward at block 636, microcontroller 314 determines whether the direction is reverse at block 642. If the direction is reverse, microcontroller 314 initializes to start viewing the left branch subroutine as illustrated at block 644. Microcontroller 314 then advances to the menu at block 640, the entry back to menu is illustrated by block 601 in FIG. 9.

If the direction is not reverse at block 642, microcontroller 314 determines the direction is left at block 646. If the direction is left, microcontroller initializes to start viewing the right branch subroutine as illustrated at block 648. Microcontroller 314 then advances to menu at block 640. If the direction is not left at block 646, microcontroller 314 advances directly to menu at block 640. The next routine would then be the "show time off" routine illustrated in FIG. 10.

Figure 15:
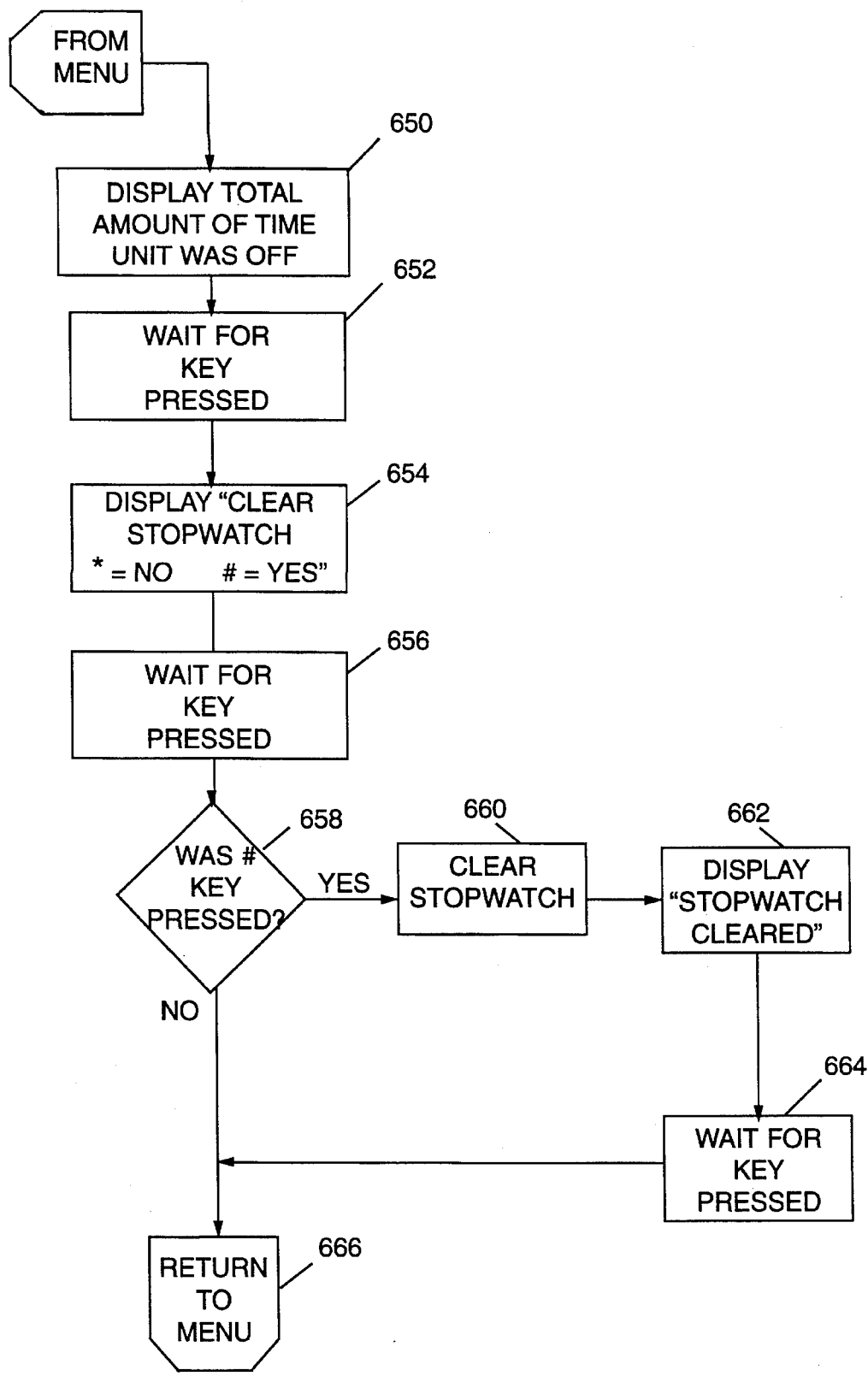
FIG. 15 is a flow chart illustrating the steps performed by the vehicle driving monitor to display the total amount of time that power was disconnected from the vehicle driving monitor.

FIG. 15 illustrates the steps performed to display the amount of time that the power supply was disconnected from the vehicle driving monitor. This time is calculated by real time clock 482 as discussed above with reference to FIG. 6. Microcontroller 314 displays the total amount of time that power was disconnected from the vehicle driving monitor at block 650. Microcontroller 314 then waits for a key to be pressed at block 652 and displays the message "Clear Stop Watch *= NO #= YES" at block 654. Microcontroller 314 then waits for a key to be pressed at block 656. Microcontroller 314 determines whether the pound key (#) was pressed at block 658. If the pound key was pressed, microcontroller 314 clears the stored time that power supply 84 was disconnected from driving monitor at block 660. Microcontroller 314 then sends a message to display 214 indicating that the stop watch has been cleared at block 662. Microcontroller then waits for the next key to be pressed at block 664 and returns to the main menu, at block 601 of FIG. 9 as illustrated at block 666. If the pound key was not pressed at block 658, microcontroller 314 returns directly to main menu at block 666.

Figure 16:
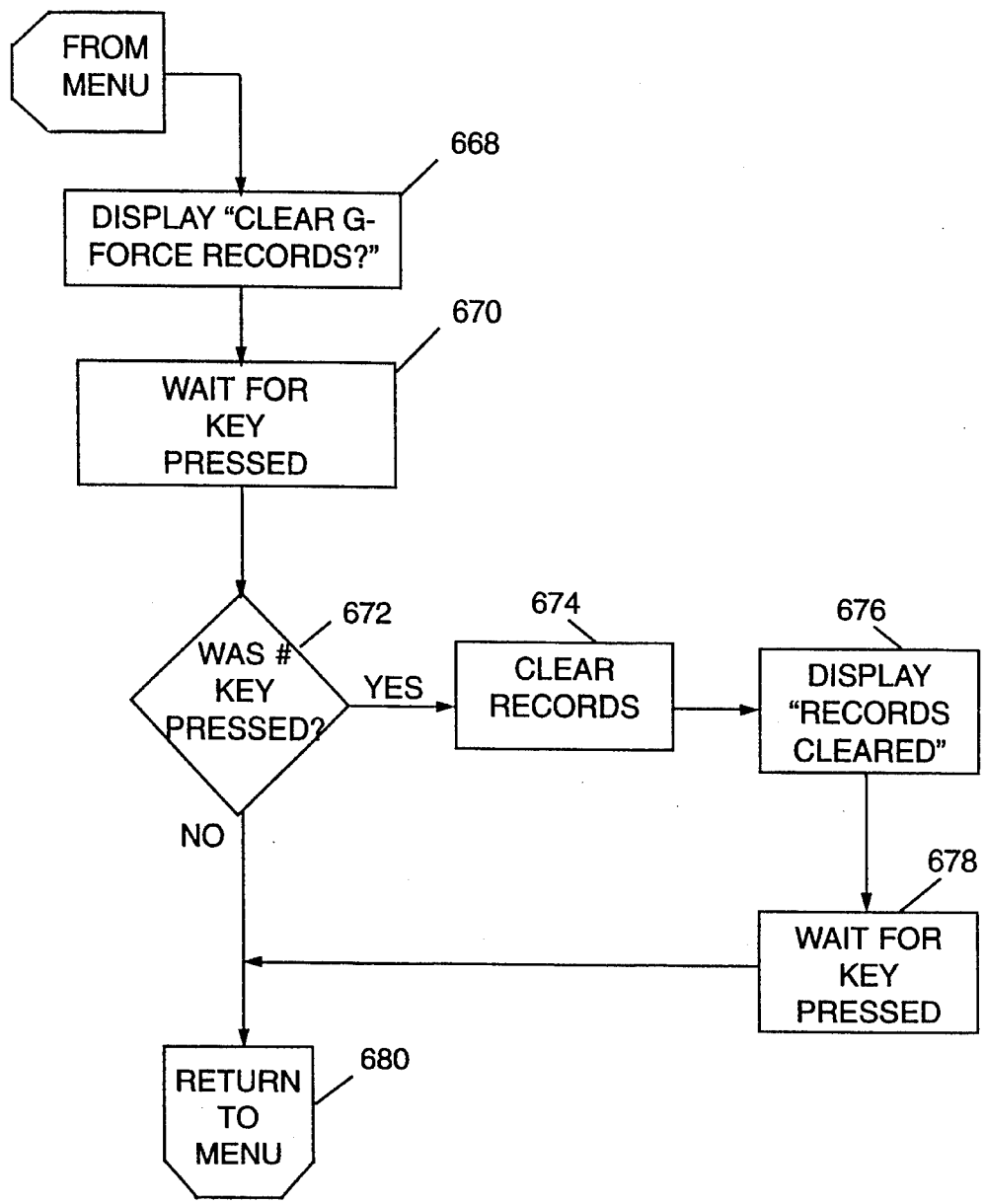
FIG. 16 is a flow chart illustrating the steps performed by the vehicle driving monitor to clear all G-force records from the memory.

FIG. 16 illustrates the steps performed by microcontroller 314 to clear the stored G-force records. Microcontroller 314 sends a prompt message to display 214 such as "Clear G-Force Records?" as illustrated at block 668. Microcontroller 314 waits for a key to be pressed at block 670. Microcontroller 314 determines whether the pound key was pressed at block 672. If the pound key was pressed, microcontroller 314 clears the stored values for the first through fifth highest records exceeding the preset limit for each of the acceleration directions at block 674. Microcontroller 314 sends a message to display 214 indicating that the records have been cleared at block 676. Microcontroller then waits for a key to be pressed at block 678 and returns to the main menu at block 601 of FIG. 9 as illustrated at block 680. If the pound key was not pressed at block 672, microcontroller returns directly to the menu at block 680 without clearing the G-force records.

Figure 17:
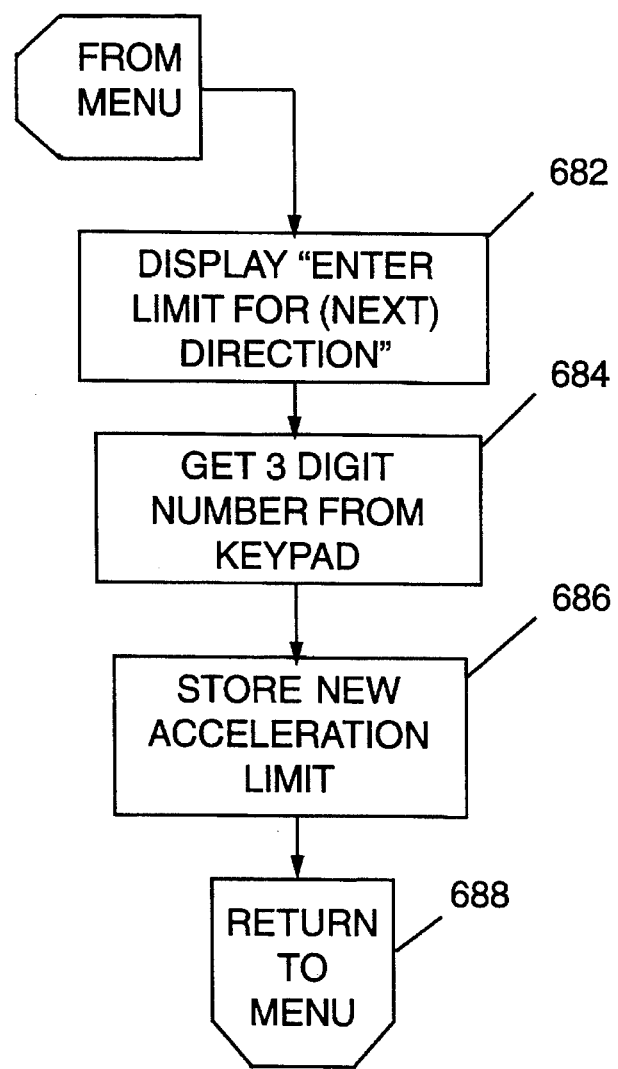
FIG. 17 is a flow chart illustrating the steps performed by the vehicle driving monitor for changing the preset limits in the forward direction, reverse direction, left direction, and right direction.

FIG. 17 illustrates the steps performed to change the preset maximum G-force limits for each of the four directions. As discussed above, the owner can select the maximum allowed G-force limits for forward, reverse, left, and right directions. These limits can be changed at any time by the owner. By selecting the "change limits" routine menu option from the menu, microcontroller 314 first permits the owner to change the limit for the forward direction by displaying "Enter Limit for Forward" on display 214 as illustrated at block 682. Microcontroller 314 then reads a three digit input number from keypad 212 at block 684 and stores the new acceleration G-force limit for the forward direction at the memory location assigned to the forward limit as illustrated at block 686. Microcontroller 314 then returns to the menu at block 601 of FIG. 9 as illustrated at block 688. Blocks 682-688 are followed sequentially for setting the reverse limit, the left limit, and the right limit using the same steps.

Figure 18A:
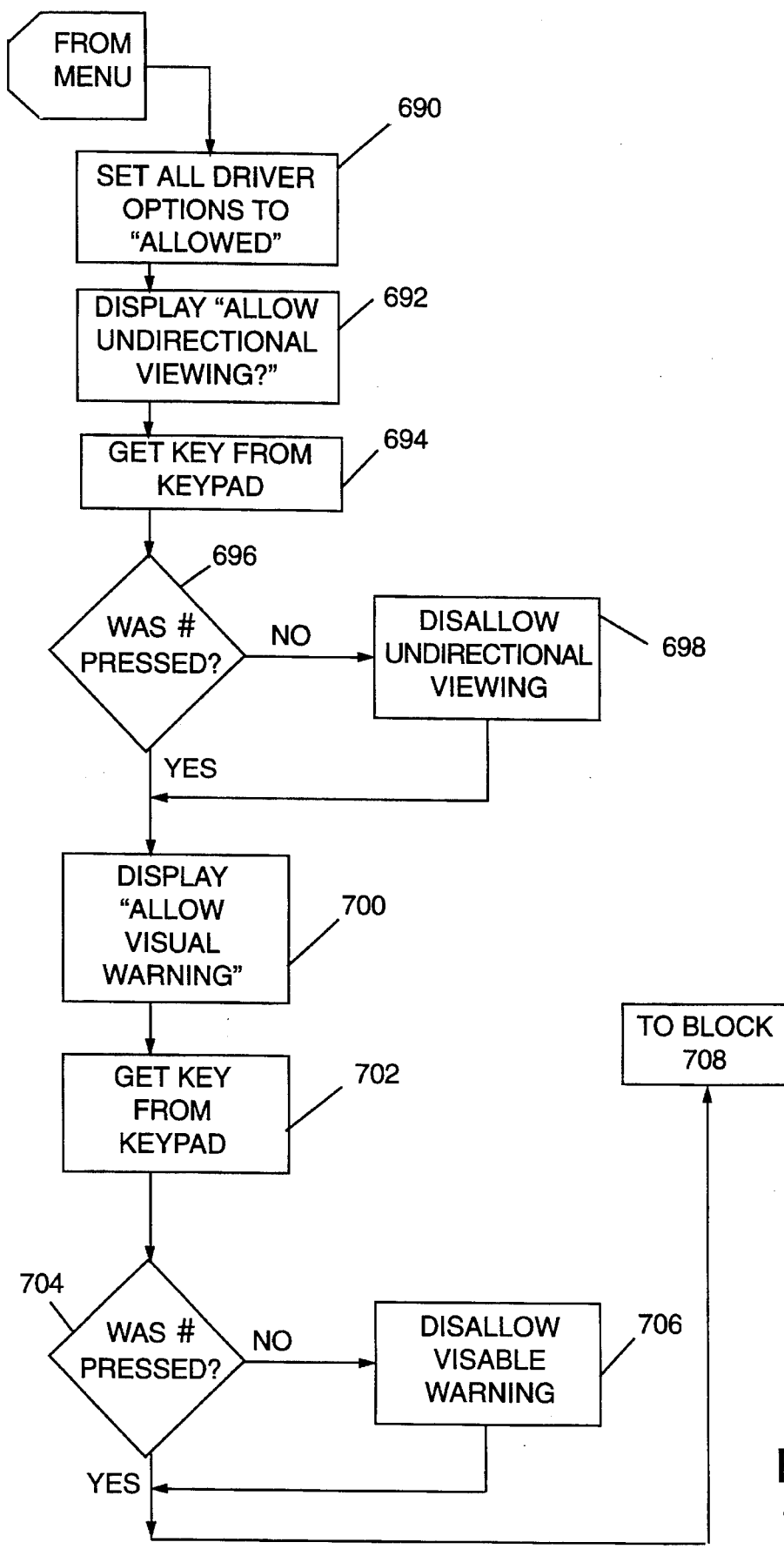
FIG. 18 is a flow chart illustrating the steps performed by the vehicle driving monitor to permit the user to control the allowable driver options.
Figure 18:
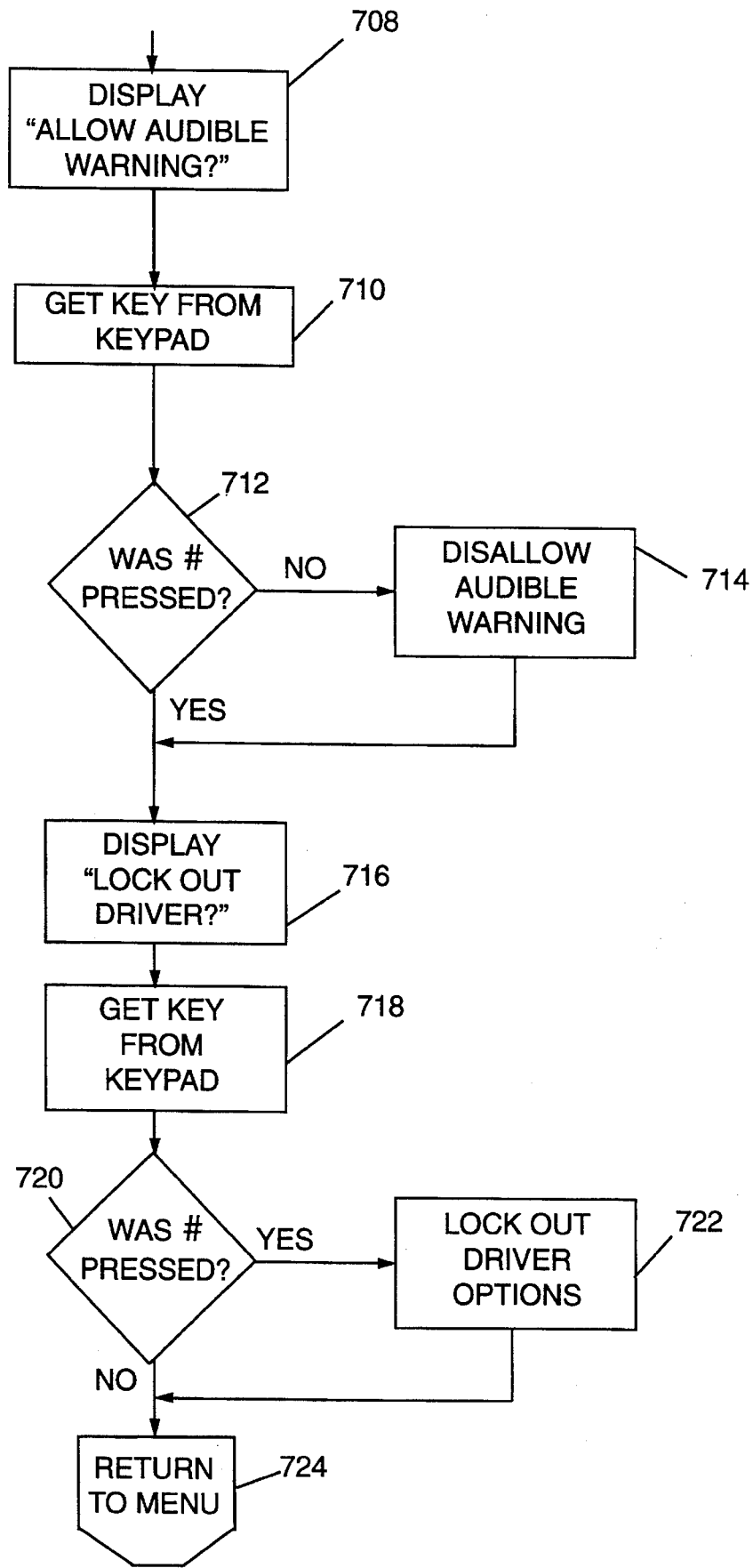

FIG. 18 illustrates the steps performed by microcontroller 314 to permit the owner to set the options available to the driver of the vehicle. In the preferred embodiment of the present invention, the pound key is used to answer "yes" to questions prompted by microcontroller 314. Microcontroller 314 initially sets all the driver options to "allowed" or "enabled" at block of FIG. 18. Microcontroller 314 then displays the prompt "Allow Unidirectional Viewing?" at block 692. Microcontroller 314 reads the key from keypad 212 at block 694. Microcontroller 314 determines whether the pound key was pressed at block 696. If the pound key was not pressed, microcontroller 314 disallows or disables the unidirectional viewing driver option at block 696. In other words, microcontroller 314 disables the driver's ability to scroll through the display to read the stored records of G-forces exceeding the preset limits. If the pound key was pressed at block 696, microcontroller 314 keeps the unidirectional viewing option enabled and then displays the prompt "Allow Visual Warning?" at block 700. Microcontroller 314 reads the entry from keypad 212 at block 702 and determines whether the pound key was pressed at block 704. If the pound key was not pressed, microcontroller 314 disallows or disables the visual warning at block 706. In other words, microcontroller 314 will not signal LEDs 238, 242, 246 or 250 in response to the driver exceeding one of the preset limits. If the pound key was pressed at block 704, microcontroller 314 keeps the visual warning at LEDs enabled so that a direction-indicating LED 238, 242, 246 or 250 corresponding the exceeded direction will become illuminated upon a violation.

Microcontroller 314 then displays the prompt "Allow Audible Warning?" at block 708. Microcontroller 314 reads the key pressed from keypad 212 at block 710 and determines whether the pound key was pressed at block 712. If the pound key was not pressed, microcontroller 314 disallows or disables the audible warning at block 714. In other words, microcontroller 314 disables tone generator 260 of FIG. 4. Therefore, tone generator 260 will not be activated when a preset limit is exceeded or when the driver is close to the preset limit. If the pound key was not pressed at block 712, microcontroller 314 displays "Lock Out Driver?" at block 716. Microcontroller 314 reads the entry from keypad 212 at block 718 and determines whether the pound key was pressed at block 720. If the pound key was pressed, microcontroller 314 locks out the driver options at block 722 and returns to the menu at block 724. If the pound key was not pressed at block 720, microcontroller returns to the menu at block 601 of FIG. 9 as illustrated at block 724 without locking out the driver options.

Figure 19:
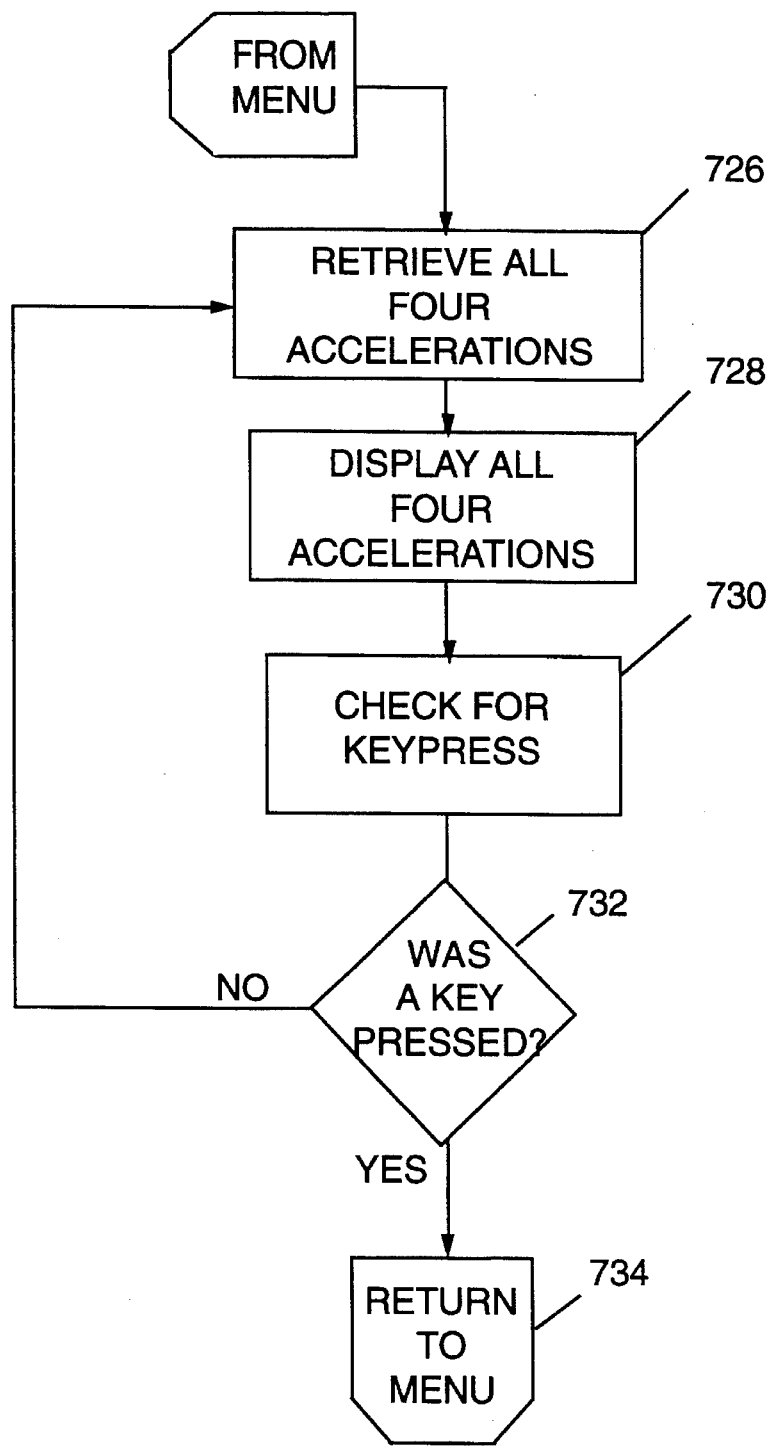
FIG. 19 is a flow chart illustrating the steps for installing and leveling the acceleration monitor in the vehicle.

The installation leveler menu option is illustrated in FIG. 19. Microcontroller 314 receives all four acceleration signals at block 726 and displays all four acceleration signals on display 214 and on LEDs 238, 242, 246, or 250 at block 728. The owner can then level the vehicle driving monitor by setting the G-force readings for each of the four directions to about zero. Microcontroller 314 checks for a key press at block 730 and determines whether a key was pressed at block 732. If the key was not pressed, microcontroller 314 returns to block 720 and receives all four accelerations again. If a key was pressed indicating that the monitor was level, microcontroller 314 returns to the menu at block 601 of FIG. 9 as illustrated at block 734.

Figure 20:
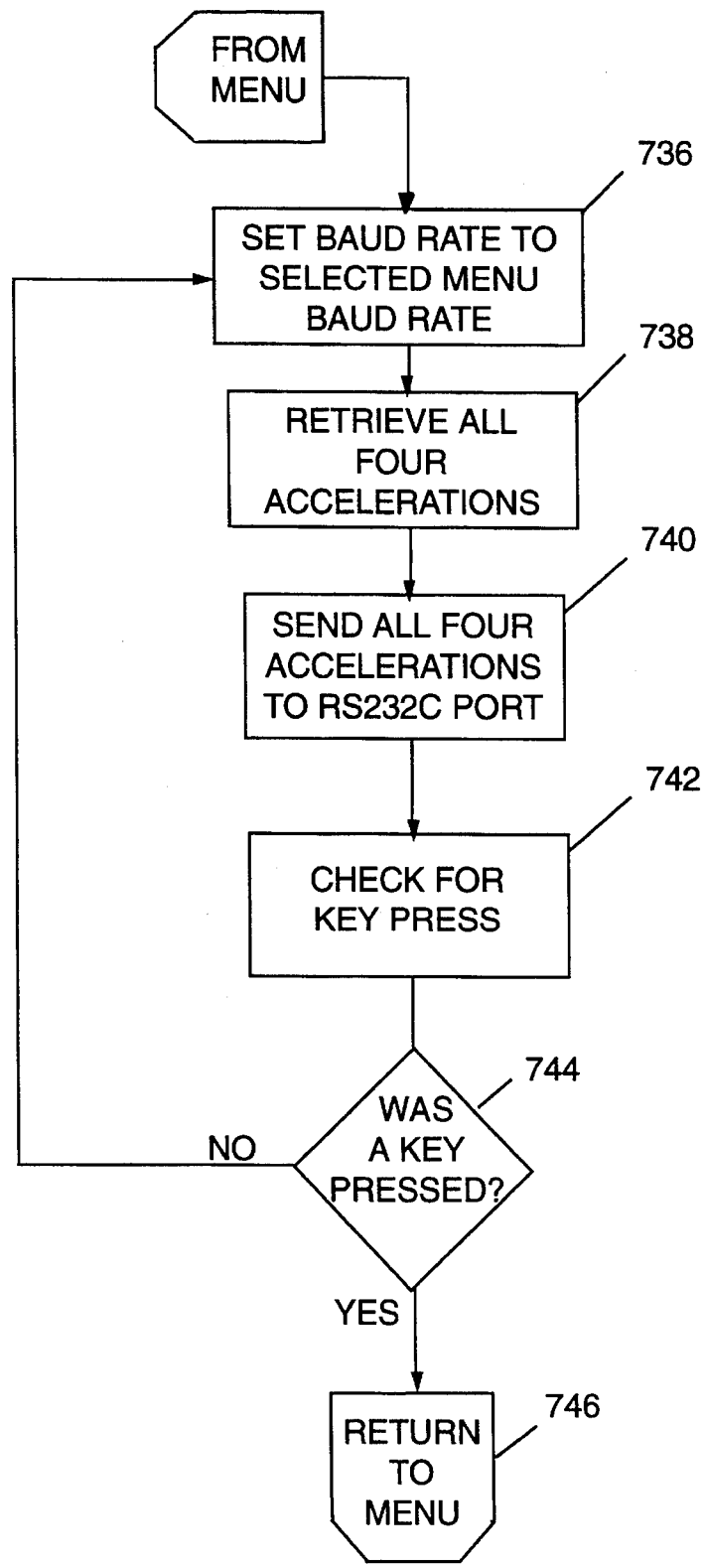
FIG. 20 is a flow chart of the steps performed by the vehicle driving monitor to send G-forces at different rates to the RS 232C port.

FIG. 20 illustrates the steps performed by microcontroller 314 to send all the G-force records to the RS 232 interface port. Microcontroller sets the baud rate to the selected menu baud rate at block 736. As illustrated in FIG. 10, the G-forces can be selectively sent at 9600 baud, 4800 baud, 2400 baud, 1200 baud, or 300 baud. The RS 232 interface port allows the user to connect the apparatus to a standard computer terminal. This permits bulk storage and listings of all real time accelerations. External software may be used for acceleration analysis. Microcontroller 314 retrieves all four acceleration signals at block 738 and sends all four acceleration signals to the RS 232 port at block 740. Microcontroller then checks for a key press at block 742 and determines whether the key has been pressed at block 744. If a key has not been pressed, microcontroller 314 returns to block 738. If a key has been pressed, microcontroller 314 returns to the menu at block 601 of FIG. 9 as illustrated at block 746.

If the exit to normal operation routine is selected from the menu of FIG. 10, microcontroller 314 initiates a total system reset.

Figure 21A:
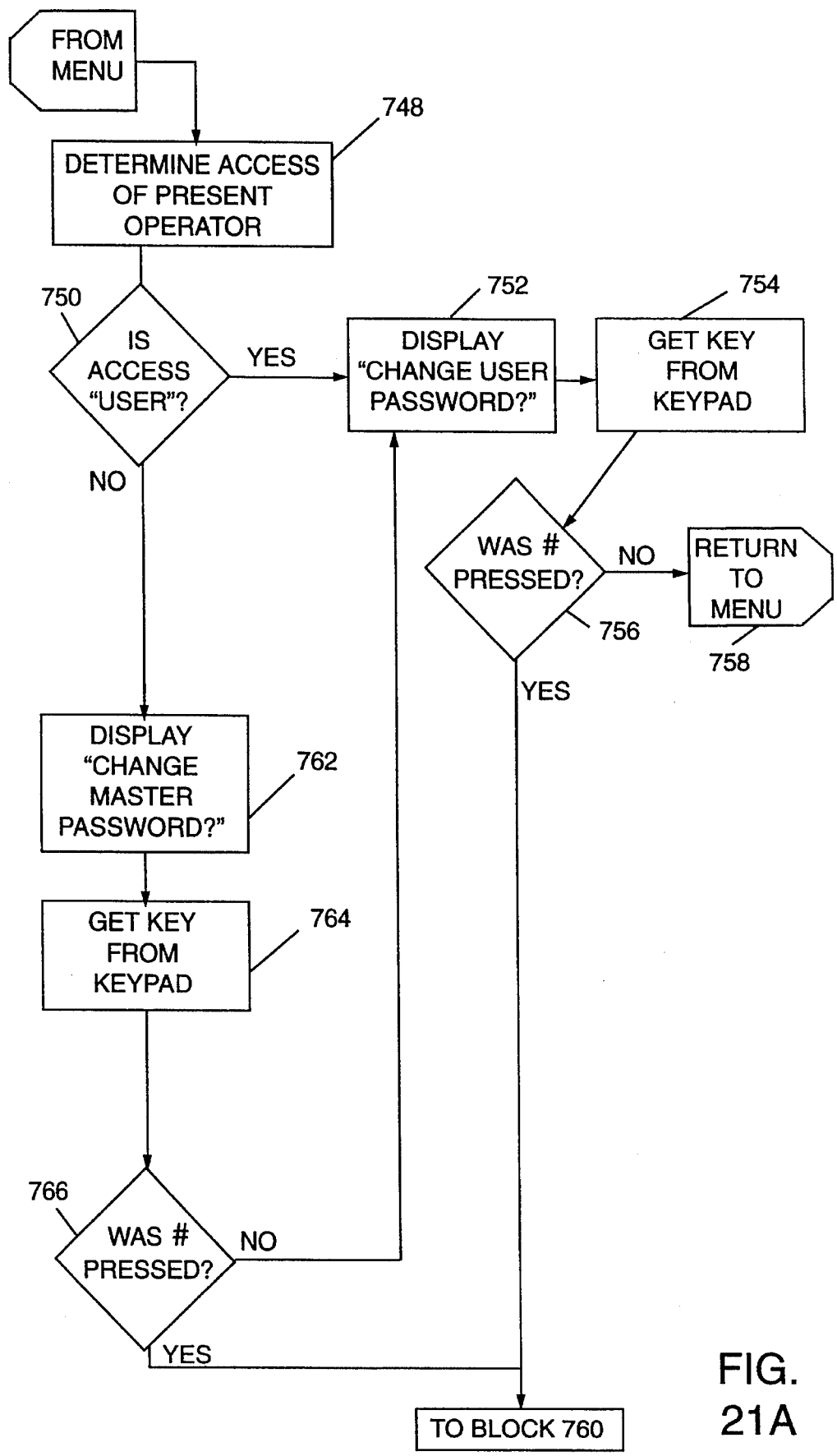
FIG. 21 is a flow chart illustrating the steps performed by the vehicle driving monitor to change user and master passwords for accessing information of the vehicle driving monitor.
Figure 21B:
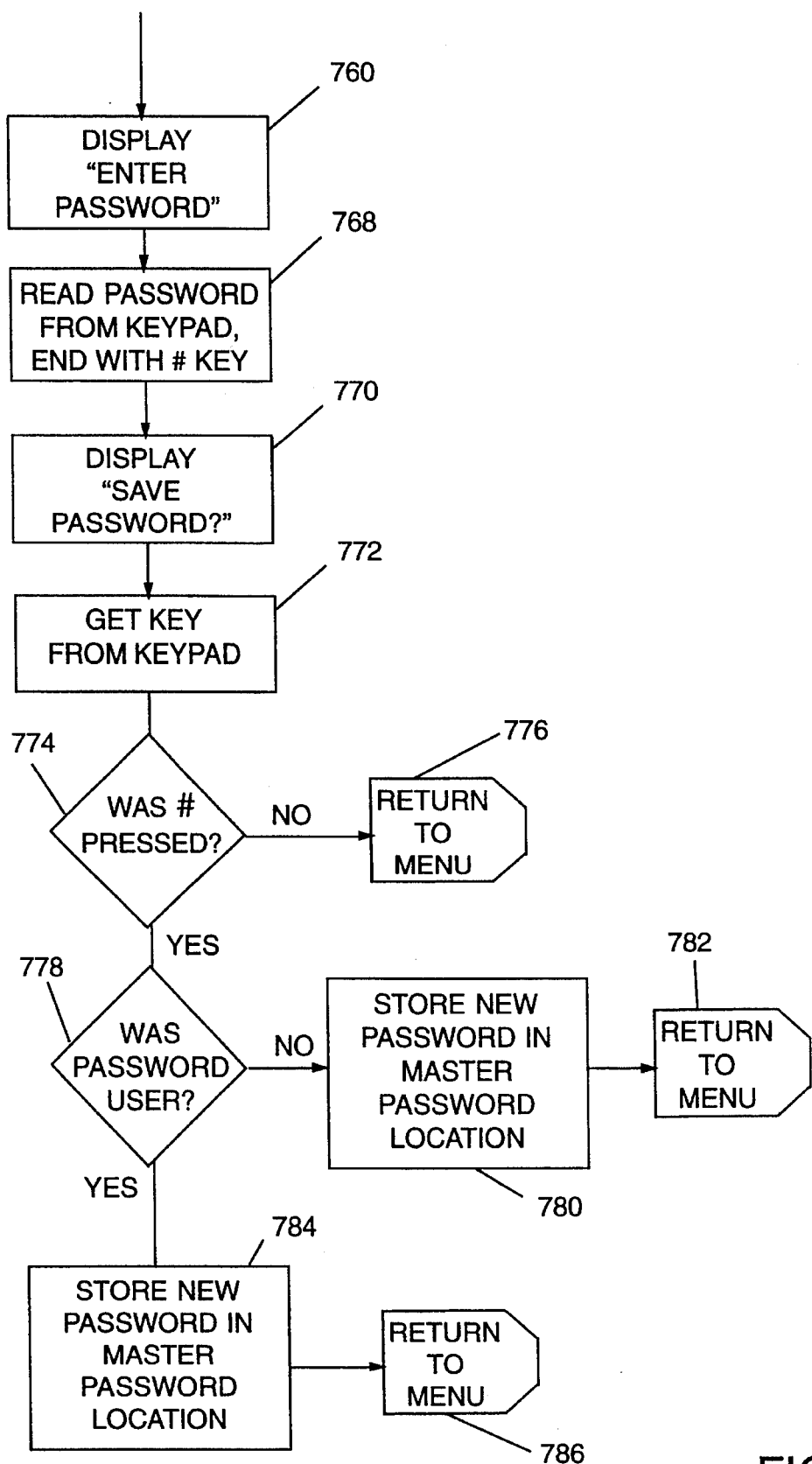

FIG. 21 illustrates the steps performed by microcontroller 314 to change the password for accessing information in a vehicle driving monitor. Microcontroller determines the access of the present operator at block 748. Microcontroller 314 determines whether the present operator is a "user or owner" at block 750. If the access is a "user", microcontroller 314 displays the prompt "Change User Password?" at block 752. Again, the pound key is used to respond in the affirmative. Microcontroller 314 reads the key press from keypad 212 at block 754 and determines whether the pound key was pressed at block 756. If the pound key was not pressed, microcontroller returns to the menu at block 601 of FIG. 9 as illustrated at block 758. If the pound key was pressed, microcontroller 314 displays the message "Enter Password" on display 214 as illustrated at block 760.

If the access of the present operator is not a "user" at block 750, microcontroller 314 displays the message "Change Master Password?" at block 762. This master password is a higher order password than the user password. This could be used for a distributor, for example. Therefore, two passwords are provided. The master password can be used if the user forgets his password. Microcontroller 314 reads the key from keypad 212 at block 764 and determines whether the pound key was pressed at block 766. If the pound key was pressed, microcontroller 314 advances to block 760 and displays the message "Enter Password". If the pound key was not pressed at block 766, microcontroller 314 proceeds to block 752 to permit the user password to be changed as discussed above.

Once the password is entered at block 760 for either the user password or the master password, microcontroller 314 reads the password from keypad 212. The pound key indicates the end of the password. This step is illustrated at block 768. Microcontroller 314 then displays the prompt "Save Password?" at block 770. Microcontroller 314 reads the entry from keypad 212 at block 772 and determines whether the pound key was pressed at block 774. If the pound key was not pressed, microcontroller 314 returns to the menu at block 601 of FIG. 9 as illustrated at block 776. If the pound key was pressed, microcontroller 314 determines whether the password was a user password at block 778. If the password was not a user password, microcontroller 314 stores the newly entered password in the master password memory location of microcontroller 314 at block 780. Microcontroller 314 then returns to the menu at block 601 as illustrated at block 782. If the password was a user password at block 778, microcontroller 314 stores the new password in the user password memory location of microcontroller 314 at block 784. Microcontroller 314 then returns to the menu at block 601 as illustrated at block 786.

Figure 22A:
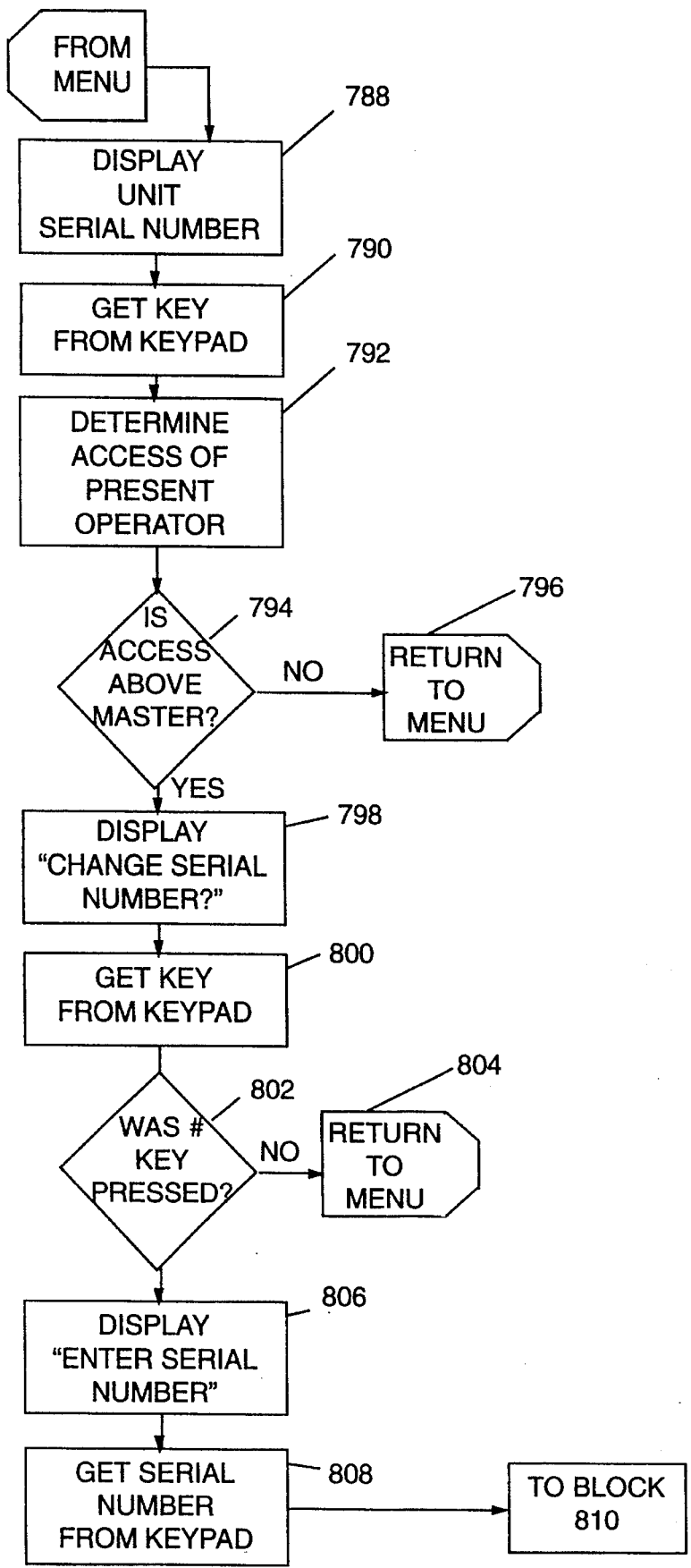
FIG. 22 is a flow chart illustrating the steps performed by the vehicle driving monitor to view or change the manufacturer password or serial number of the vehicle driving monitor.
Figure 22B:
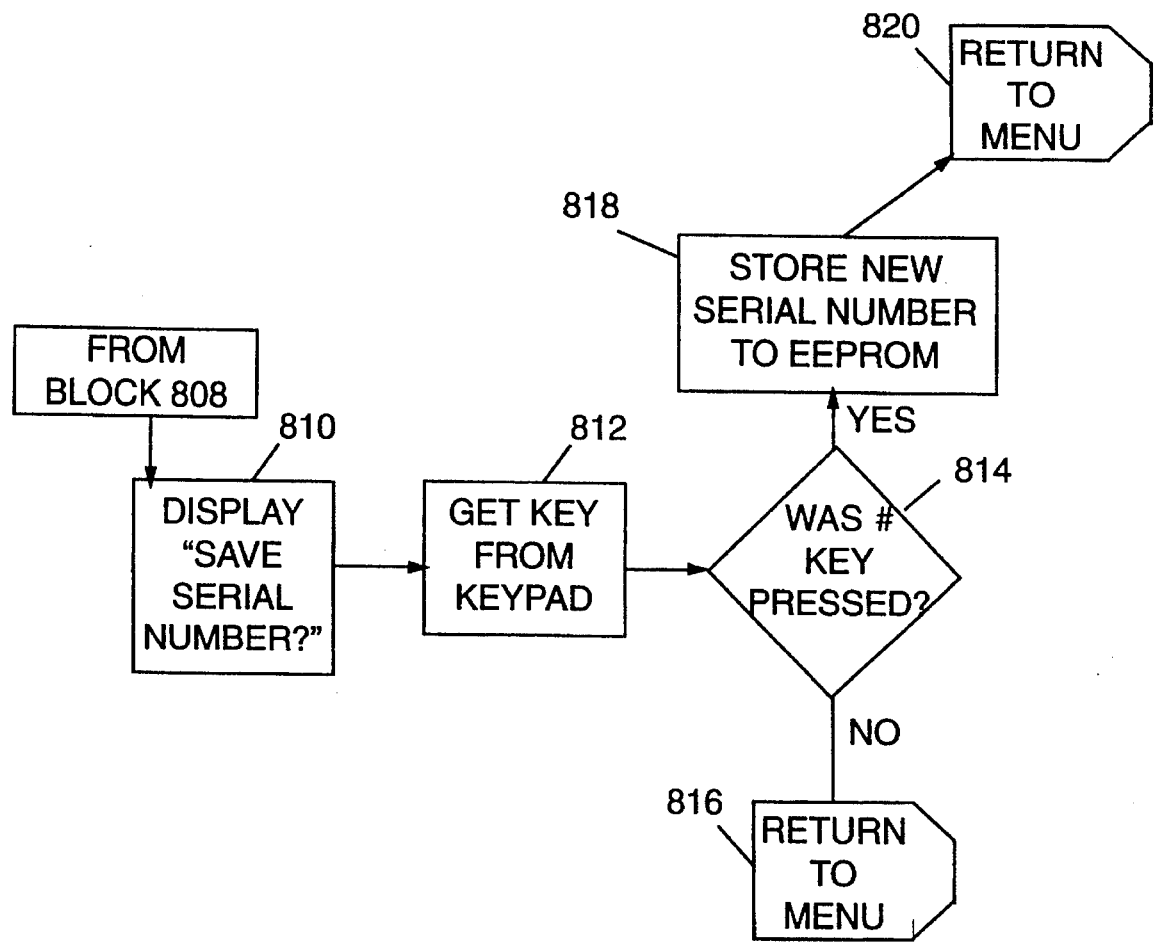

The last menu option illustrated in FIG. 10 is the view/change serial number menu option. This menu option is illustrated in FIG. 22. The serial number is set by the manufacturer. The serial number for the particular unit is displayed by the microcontroller 314 on display 214 at block 788. Microcontroller 314 reads an input from keypad 212 at block 790. Microcontroller 314 then determines the access level of the present operator by referring to the operator's password at block 792. As discussed above, the passwords include a user level, a master level, and a manufacturer level. Microcontroller 314 determines whether the operator access level is above the master level at block 794. If the access level is not above master level, the present operator is not permitted to change the serial number of the unit. Therefore, microcontroller 314 returns to the main menu at block 601 as illustrated at block 796.

If the access level of the present operator is above master level, microcontroller 314 displays the prompt "Change Serial Number?" at block 798. Microcontroller then reads the key pressed on keypad 212 at block 800 and determines whether the pound key was pressed at block 802. Again, the pound key indicates an affirmative response to the question displayed by microcontroller 314. If the pound key was not pressed, microcontroller 314 returns to the main menu at block 601 as illustrated at block 804. If the pound key was pressed, microcontroller 314 displays the message "Enter Serial Number" at block 806. Microcontroller 314 reads the serial number from keypad 212 at block 808 and displays the message "Save Serial Number?" at block 810. Microcontroller 314 reads the key pressed from keypad 212 at block 812 and determines whether the pound key was pressed at block 814. If the pound key was pressed indicating that the present operator does not want to save the serial number, microcontroller 314 returns to the menu at block 601 as illustrated at block 816. If the pound key was pressed at block 814, microcontroller 314 stores the new serial number entered at block 808 in the EEPROM of microcontroller 314 at block 818. Microcontroller 314 then returns to the menu at block 601 of FIG. 9 as illustrated at block 820.

It is understood that microcontroller 314 may be programmed to record all or a predetermined number of the highest G-forces in each of the four directions regardless of whether or not these G-forces exceed the preset limits. The monitor may also be set up with an optional sports feature which would include a constant readout of G-forces in a mode selected by the driver. In addition, the monitor can be programmed to display a G-force automatically when the driver exceeds the preset maximum G-force limit for a particular direction. The monitor records the amount of time that an engine is running in order to schedule the vehicle for maintenance based upon the time the engine is on, rather than the number of miles driven. By determining the number of miles the vehicle has been driven, an average speed can be calculated based upon the clock signal indicating the amount of time that the engine was running.

Although the invention has been described in detail with reference to a certain illustrated embodiment, variations and modifications exist within the scope and spirit of the invention as described and defined in the following claims.

What is claimed is:

1. An apparatus powered by a power supply for monitoring operation of a vehicle, the apparatus comprising:

a sensor configured to generate an output signal proportional to G-forces on the vehicle;

means coupled to the sensor for storing a value of the G-force output signal generated by the sensor when said value is greater than a selected limit;

means for detecting that the power supply for powering the apparatus has been disconnected, thereby providing an indication that the vehicle was driven without the sensor and storing means in operation; and means coupled to the storing means for analyzing a password to determine whether a user is authorized to change said selected limit.

2. The apparatus of claim 1, wherein the detecting means includes a counter for indicating the number of times the apparatus has been disconnected from the power supply.

3. The apparatus of claim 1, wherein the detecting means includes a clock which is activated upon disconnection of the power supply from the apparatus, and means coupled to the clock for storing a total length of time that the apparatus is disconnected from the power supply.

4. The apparatus of claim 1, wherein the storing means stores a predetermined number of the G-force output signal values from the sensor in a non-volatile memory upon detection of disconnection of the power supply from the apparatus by the detecting means.

5. The apparatus of claim 1, further comprising means for preventing an unauthorized person from erasing the G-force output signals stored by the storing means.

6. The apparatus of claim 1, further comprising means coupled to the sensor for generating a warning signal when the G-force output signal from the sensor exceeds a threshold level which is a predetermined amount less than the selected G-force limit to permit a driver to correct a driving condition before the selected G-force limit is exceeded.

7. The apparatus of claim 1, further comprising means for permitting an authorized user to change the selected G-force limit.

8. The apparatus of claim 1, further comprising means for displaying selected G-force output signals stored by the storing means.

9. The apparatus of claim 8, further comprising means for permitting an authorized user to disable the displaying means.

10. The apparatus of claim 1, wherein the sensor includes first and second acceleration sensors, the first acceleration sensor generating an output signal indicating both forward direction and reverse direction G-forces on the vehicle and the second acceleration sensor generating an output signal indicating left direction and right direction G-forces on the vehicle.

11. The apparatus of claim 1, further comprising an oven surrounding the sensor for heating the sensor to a predetermined temperature, thereby improving the accuracy of the output signal from the sensor upon fluctuation of an ambient temperature adjacent the apparatus.

12. The apparatus of claim 1, further comprising means for coupling the storing means to a computer to transfer information stored in the storing means into the computer.

13. The apparatus of claim 1, further comprising means coupled to the sensor for generating a warning signal when the G-force output signal from the sensor exceeds said selected G-force limit.

14. An apparatus powered by a power supply for monitoring operation of a vehicle, the apparatus comprising:

a sensor configured to generate an output signal proportional to G-forces on the vehicle;

means coupled to the sensor for storing a value of the G-force output signal generated by the sensor when said value is greater than a selected limit; and means coupled to the sensor for determining that an engine of the vehicle is running.

15. The apparatus of claim 14, further comprising means coupled to the determining means for recording a total amount of time that the engine of the vehicle is running.

16. An apparatus for monitoring operation of a vehicle, the apparatus comprising:

a sensor for detecting G-forces on the vehicle, the sensor generating an output signal proportional to the G-forces on the vehicle;

means coupled to the sensor for monitoring the output signal from the sensor; and an oven surrounding the sensor for heating the sensor to a predetermined temperature, thereby improving the accuracy of the output signal from the sensor upon fluctuation of an ambient temperature adjacent the apparatus.

17. The apparatus of claim 16, further comprising means for detecting that a power supply for powering the apparatus has been disconnected from the apparatus, thereby providing an indication that the vehicle was driven without the sensor and monitoring means in operation.

18. The apparatus of claim 17, wherein the detecting means includes a clock which is activated upon disconnection of the power supply from the apparatus, and means coupled to the clock for storing the total length of time that the apparatus is disconnected from the power supply.

19. The apparatus of claim 16, wherein the monitoring means includes means for storing G-force output signals generated by the sensor which are higher than a selected maximum G-force limit.

20. The apparatus of claim 16, wherein the monitoring means includes means coupled to the sensor for generating a warning signal when said G-force output signal generated by the sensor is greater than a selected threshold level.

21. The apparatus of claim 16, wherein the G-force sensor includes first and second acceleration sensors, the first acceleration sensor generating an output signal indicating both forward direction and reverse direction G-forces on the vehicle and the second acceleration sensor generating an output signal indicating both left direction and right direction G-forces on the vehicle.

22. The apparatus of claim 21, wherein the monitoring means includes means for permitting an authorized user to set a selected maximum G-force limit for each of the forward direction, the reverse direction, the left direction, and the right direction, and means for storing G-force output signals generated by sensor which are greater than the maximum selected limit for each of the forward direction, the reverse direction, the left direction, and the right direction.

23. The apparatus of claim 19, further comprising means coupled to the storing means for analyzing a password to determine whether a user is authorized to change said selected maximum G-force limit.

24. An apparatus for monitoring operation of a vehicle, the apparatus comprising:

a sensor configured to generate output signals proportional to a forward G-force and a reverse G-force on the vehicle;

means for permitting an authorized user to set a selected maximum G-force limit for each of the forward direction and the reverse direction, the means for permitting an authorized user to set a selected maximum G-force limit including means for analyzing a password of the user to determine whether the user is authorized to set the maximum G-force limits; and means coupled to the sensor for storing G-force output signals generated by sensor which are greater than the maximum selected limit for the forward direction and the reverse direction.

25. The apparatus of claim 24, further comprising means coupled to the storing means for displaying selected G-force output signals stored by the storing means.

26. The apparatus of claim 25, further comprising means coupled to the displaying means for permitting an authorized user to disable the displaying means.

27. The apparatus of claim 24, further comprising means coupled to the sensor for generating a warning signal when a G-force output signal generated by the sensor is greater than a selected threshold level.

28. The apparatus of claim 27, wherein the means generating a warning signal also includes means for indicating the direction in which the G-force has exceeded the selected limit.

29. The apparatus of claim 24, further comprising means for coupling the storing means to a computer to transfer information stored in the storing means into the computer.

30. The apparatus of claim 24, further comprising an oven surrounding the sensor for heating the sensor to a predetermined temperature, thereby improving the accuracy of the output signal from the sensor upon fluctuation of an ambient temperature adjacent the apparatus.

31. The apparatus of claim 24, wherein the sensor includes first and second acceleration sensors, the first acceleration sensor generating an output signal indicating both the forward direction and the reverse direction G-forces on the vehicle and the second acceleration sensor generating an output signal indicating a left direction G-force and a right direction G-force on the vehicle.

32. The apparatus of claim 24, further comprising means for detecting that a power supply for powering the apparatus has been disconnected from the apparatus, thereby providing an indication that the vehicle was driven without the sensor and storing means in operation.

33. The apparatus of claim 32, wherein the detecting means includes a clock which is activated upon disconnection of the power supply from the apparatus, and means coupled to the clock for storing the total length of time that the apparatus is disconnected from the power supply.

\* \* \* \* \*